(12) United States Patent
Ko et al.

(10) Patent No.: US 9,979,498 B2
(45) Date of Patent: *May 22, 2018

(54) BROADCAST-SIGNAL TRANSMITTER/RECEIVER AND METHOD FOR TRANSMITTING/RECEIVING BROADCAST SIGNALS

(71) Applicant: LG ELECTRONICS INC., Seoul (KR)

(72) Inventors: Woosuk Ko, Seoul (KR); Seoyoung Back, Seoul (KR); Sangchul Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 15/456,693

(22) Filed: Mar. 13, 2017

(65) Prior Publication Data

US 2017/0187477 A1    Jun. 29, 2017

Related U.S. Application Data

(63) Continuation of application No. 15/056,581, filed on Feb. 29, 2016, now Pat. No. 9,628,221, which is a
(Continued)

(51) Int. Cl.
*H04L 27/00* (2006.01)
*H03K 9/00* (2006.01)
(Continued)

(52) U.S. Cl.
CPC ........... *H04H 20/72* (2013.01); *H04B 7/0413* (2013.01); *H04H 20/42* (2013.01); *H04H 20/71* (2013.01);
(Continued)

(58) Field of Classification Search
USPC ..... 375/219, 220, 222, 240.26, 240.27, 254, 375/259, 272, 285, 284, 293, 295, 303,
(Continued)

(56) References Cited

U.S. PATENT DOCUMENTS

2007/0054632 A1   3/2007  Lu et al.
2008/0002566 A1   1/2008  Zhang et al.
(Continued)

FOREIGN PATENT DOCUMENTS

KR    1020090085515 A    8/2009
WO    WO 2009/028911 A2  3/2009
WO    WO 2009/028912 A2  3/2009

*Primary Examiner* — Linda Wong
(74) *Attorney, Agent, or Firm* — Dentons US LLP

(57) ABSTRACT

The broadcast-signal transmitter according to one embodiment of the present invention includes: an encoder for encoding physical layer pipe (PLP) data, including a base layer and an enhancement layer of a broadcasting service, and signaling information through a SISO, and/or MIMO technique; a frame builder for generating a transmission frame, which includes a preamble having the encoded signaling information and the PLP data and an OFDM generator for modulating and transmitting a broadcast signal including the transmission frame.

8 Claims, 30 Drawing Sheets

Related U.S. Application Data continuation of application No. 13/885,971, filed as application No. PCT/KR2011/008288 on Nov. 2, 2011, now Pat. No. 9,325,438.

(60) Provisional application No. 61/414,437, filed on Nov. 17, 2010, provisional application No. 61/420,331, filed on Dec. 7, 2010.

(51) Int. Cl.

| | |
|---|---|
| *H04H 20/72* | (2008.01) |
| *H04H 20/42* | (2008.01) |
| *H04H 20/71* | (2008.01) |
| *H04B 7/0413* | (2017.01) |
| *H04L 1/00* | (2006.01) |
| *H04L 1/06* | (2006.01) |
| *H04L 27/26* | (2006.01) |
| *H04L 27/12* | (2006.01) |
| *H04L 29/06* | (2006.01) |
| *H04L 25/03* | (2006.01) |
| *H04L 29/08* | (2006.01) |

(52) U.S. Cl.
CPC .......... *H04L 1/0054* (2013.01); *H04L 1/0071* (2013.01); *H04L 1/0083* (2013.01); *H04L 1/0668* (2013.01); *H04L 27/12* (2013.01); *H04L 27/2613* (2013.01); *H04L 27/2627* (2013.01); *H04L 69/22* (2013.01); *H04L 25/03006* (2013.01); *H04L 69/323* (2013.01)

(58) Field of Classification Search
USPC ....... 375/309, 316, 323, 334, 335, 336, 344, 375/346, 354, 362
See application file for complete search history.

(56) References Cited

U.S. PATENT DOCUMENTS

| | | |
|---|---|---|
| 2009/0213853 A1 | 8/2009 | Kwon et al. |
| 2009/0225822 A1* | 9/2009 | Tupala ................ H04L 27/2659 375/226 |
| 2010/0091916 A1 | 4/2010 | Henriksson et al. |
| 2010/0195636 A1* | 8/2010 | Nakashima ........... H04L 5/0053 370/342 |
| 2010/0310017 A1* | 12/2010 | Atungsiri ...................... 375/340 |
| 2011/0013718 A1* | 1/2011 | Ko et al. ...................... 375/295 |
| 2011/0019101 A1* | 1/2011 | Goto .................. H04L 27/2659 348/725 |
| 2011/0019782 A1* | 1/2011 | Kobayashi .......... H04L 27/2659 375/344 |
| 2011/0044401 A1 | 2/2011 | Ko et al. |
| 2011/0099445 A1 | 4/2011 | Goto et al. |
| 2011/0110318 A1 | 5/2011 | Park et al. |
| 2011/0131464 A1 | 6/2011 | Ko et al. |
| 2011/0305300 A1* | 12/2011 | Ko ................. 375/298 |
| 2013/0343468 A1 | 12/2013 | Ko et al. |
| 2015/0043666 A1 | 2/2015 | Hwang et al. |

* cited by examiner

BROADCAST-SIGNAL TRANSMITTER/RECEIVER AND METHOD FOR TRANSMITTING/RECEIVING BROADCAST SIGNALS

This application is a Continuation of U.S. patent application Ser. No. 15/056,581, filed on Feb. 29, 2016, which is a Continuation of U.S. patent application Ser. No. 13/885,971, filed on May 16, 2013, now U.S. Pat. No. 9,325,438, which is a National Stage Application of International Application No. PCT/KR2011/008288 filed on Nov. 2, 2011, and claims priority of U.S. Provisional Application No. 61/414,437 filed on Nov. 17, 2010 and U.S. Provisional Application No. 61/420,331 filed on Dec. 7, 2010, all of which are incorporated by reference in their entirety herein.

FIELD OF THE INVENTION

The present invention relates to a method for transceiving broadcast signals and an apparatus for transceiving broadcast signals, and more particularly, to a method for transceiving broadcast signals, which can enhance data transmission efficiency and is compatible with conventional methods for transceiving broadcast signals, and a transceiving apparatus thereof.

BACKGROUND ART

A broadband wireless communication system is based on an orthogonal frequency division multiplexing (OFDM) scheme and an orthogonal frequency division multiple access (OFDMA) scheme, and transmits a physical channel signal using a plurality of subcarriers so as to implement high-speed data transmission.

Downlink data types transmitted from a base station (BS) to a mobile station (MS) can be largely classified into a multicasting/broadcasting data type and a unicast type. The multicasting/broadcasting data type can be used for the BS to transmit system information, configuration information, software update information, etc. to one or more groups including unspecific/specific MSs. The unicast data type may be used for the BS to transmit requested information to a specific MS, or may also be used to transmit a message including information (for example, configuration information) to be transferred only to a specific MS.

DETAILED DESCRIPTION OF THE INVENTION

Technical Problem

A technical object of one embodiment of the present invention is to provide a method and apparatus for transceiving broadcast signals, which can enhance data transmission efficiency in a digital broadcast system.

A further technical object of the present invention is to provide a method and apparatus for transceiving broadcast signals, which can maintain compatibility with a conventional broadcast system in addition to achieving the above described objects.

Technical Solution

The object of the present invention can be achieved by providing a method for receiving a broadcast signal including: receiving a broadcast signal including a transmission frame configured to transmit a broadcast service, and OFDM-demodulating the received broadcast signal; parsing the transmission frame contained in the OFDM-demodulated broadcast signal, wherein the transmission frame includes a preamble and PLP (Physical_Layer_Pipe) data, the preamble includes signaling information, the signaling information configured to transmit decoding information of the PLP data, and the PLP data configured to include a base layer and an enhancement layer of a broadcast service; and decoding the signaling information and the PLP data using at least one of SISO, MISO and MIMO.

Effects of the Invention

As is apparent from the above description, in a digital broadcast system, it is possible to enhance data transmission efficiency and increase robustness in terms of transmission and reception of broadcast signals, by virtue of provision of a MIMO system.

Further, according to the present invention, in a digital broadcast system, it is possible to decode MIMO receiving signals efficiently using MIMO processing of the present invention even under a diverse broadcast environment.

In addition, according to the present invention, a broadcast system using MIMO of the present invention can achieve the above described advantages while maintaining compatibility with a conventional broadcast system not using MIMO.

Further, according to the present invention, it is possible to provide a method and apparatus for transceiving broadcast signals, which can receive digital broadcast signals without error even under an indoor environment or using mobile reception equipment.

BEST MODE FOR CARRYING OUT THE INVENTION

Figure 1:
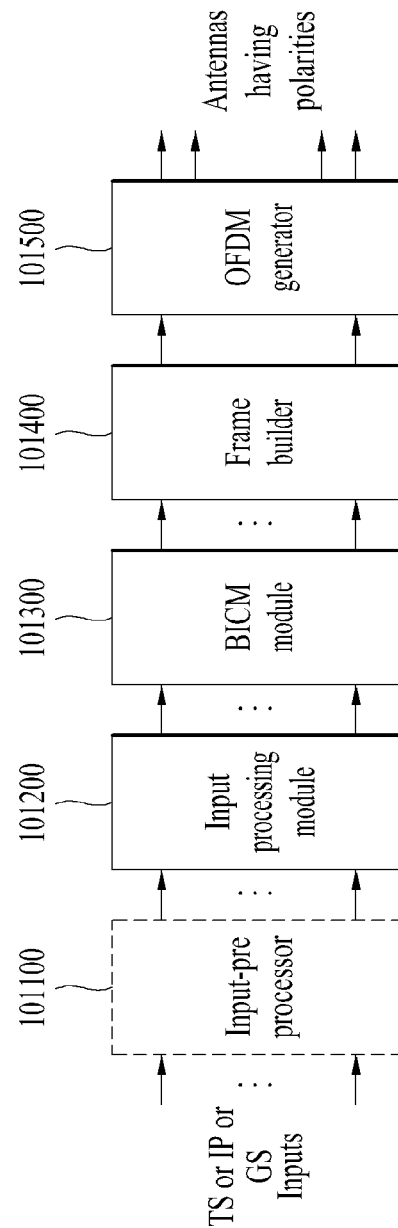
FIG. 1 shows a broadcast signal transmitter using MIMO according to an embodiment of the present invention.

Hereinafter, although the preferred embodiments of the present invention will be described in detail with reference to the accompanying drawings and contents as described with relation to the accompanying drawings, it is to be understood that the present invention is not limited to the embodiments.

Various technologies have been introduced to increase transmission efficiency and to perform robust communication in a digital broadcast system. One of such technologies is a method of using a plurality of antennas at a transmitting side or a receiving side. This method may be classified into a Single-Input Single-Output (SISO) scheme in which transmission is performed through a single antenna and reception is performed through a single antenna, a Single-Input Multi-Output (SIMO) scheme in which transmission is performed through a single antenna and reception is performed through multiple antennas, a Multi-Input Single-Output (MISO) scheme in which transmission is performed through multiple antennas and reception is performed through a single antenna, and a Multi-Input Multi-Output (MIMO) scheme in which transmission is performed through multiple antennas and reception is performed through multiple antennas. Although the multiple antennas may be exemplified by 2 antennas for ease of explanation in the following description, the description of the present invention may be applied to systems that use 2 or more antennas.

The SISO scheme corresponds to a general broadcast system that uses 1 transmission antenna and 1 reception antenna. The SIMO scheme corresponds to a broadcast system that uses 1 transmission antenna and a plurality of reception antennas.

The MISO scheme corresponds to a broadcast system that uses a plurality of transmission antennas and 1 reception antenna to provide transmit diversity. An example of the MISO scheme is an Alamouti scheme. In the MISO scheme, it is possible to receive data through 1 antenna without performance loss. Although a reception system can receive the same data through a plurality of reception antennas in order to improve performance, this case will be described as belonging to MISO cases in this specification.

A MIMO scheme corresponds to a broadcast system that uses a plurality of transmit (Tx) antennas and a plurality of receive (Rx) antennas to provide transmission/reception (Tx/Rx) diversity and high transmission efficiency. In the MIMO scheme, signals are processed in different ways in time and space dimensions and a plurality of data streams is transmitted through parallel paths that simultaneously operate in the same frequency band to achieve diversity effects and high transmission efficiency.

The performance of a system that employs the MIMO technology depends on characteristics of a transmission channel. The efficiency of such a system is high, especially, when the system has independent channel environments. That is, the performance of the system that employs the MIMO technology may improve when channels of all antennas ranging from antennas of the transmitting side and antennas of the receiving side are independent channels that have no correlation to each other. However, in a channel environment in which the correlations between channels of transmission and reception antennas are very high as in a line-of-sight (LOS) environment, the performance of the system that employs the MIMO technology may be significantly reduced or the system may not be able to operate.

In addition, if the MIMO scheme is applied to a broadcast system that uses the SISO and MISO schemes, it is possible to increase data transmission efficiency. However, in addition to the above problems, there is a need to maintain compatibility to allow a receiver having a single antenna to receive services. Accordingly, the present invention suggests a method for solving such existing problems.

In addition, the present invention can provide a broadcast signal transmitter/receiver and a broadcast transmission and reception method for a conventional terrestrial broadcast system and a system that can transmit and receive additional broadcast signals (or enhanced broadcast signals), for example, mobile broadcast signals, while sharing an RF frequency band with a terrestrial broadcast system such as DVB-T2.

To accomplish this, in the present invention, it is possible to use a video coding method having scalability in which a basic video component which has low image quality although it is robust to a communication environment and an extended video component which is slightly weak to a communication environment although it can provide a high-quality image can be distinguishably transmitted. Although the present invention will be described with reference to SVC as a video coding method having scalability, the present invention may be applied to any other video coding methods. Embodiment of the present invention will be described in more detail with reference to the drawings.

A broadcast signal transmitter and receiver of the present invention can perform MISO processing and MIMO processing on a plurality of signals that are transmitted and received through a plurality of antennas. The following is a description of a broadcast signal transmitter and receiver that performs signal processing on 2 signals that are transmitted and received through 2 antennas.

FIG. 1 shows a broadcast signal transmitter using MIMO according to an embodiment of the present invention.

As shown in FIG. 1, the broadcast signal transmitter according to the present invention may include an input processor 101100, an input processing module 101200, a Bit Interleaved Coded Modulation (BICM) encoder 101300, a frame builder 101400, and an Orthogonal Frequency-Division Multiplexing (OFDM) generator (or transmitter) 101500. The broadcast signal transmitter according to the present invention may receive a plurality of MPEG-TS streams or a General Stream Encapsulation (GSE) stream (or GS stream).

The input processor 101100 may generate a plurality of PLPs (physical layer pipes) on a service basis in order to give robustness to a plurality of input streams, i.e., a plurality of MPEG-TS streams or GSE streams.

PLPs are data units that are identified in the physical layer. Specifically, a PLP is data having the same physical layer attribute which is processed in the transmission path and may be mapped on a cell by cell basis in a frame. In addition, a PLP may be considered a physical layer Time Division Multiplexing (TDM) channel that carries one or a plurality of services. Specifically, a path through which such a service is transmitted is transmitted or a stream identifiable in the physical layer which is transmitted through the path is referred to as a PLP.

Thereafter, the input processing module 101200 may generate a Base Band (BB) frame including a plurality of generated PLPs. The BICM module 101300 may add redundancy to the BB frame to correct an error in a transmission channel and may interleave PLP data included in the BB frame.

The frame builder 101400 may accomplish a transmission frame structure by mapping the plurality of PLPs to a transmission frame and adding signaling information thereto. The OFDM generator 101500 may demodulate input data from the frame builder according to OFDM to divide the input data into a plurality of paths such that the input data is transmitted through a plurality of antennas.

Figure 2:
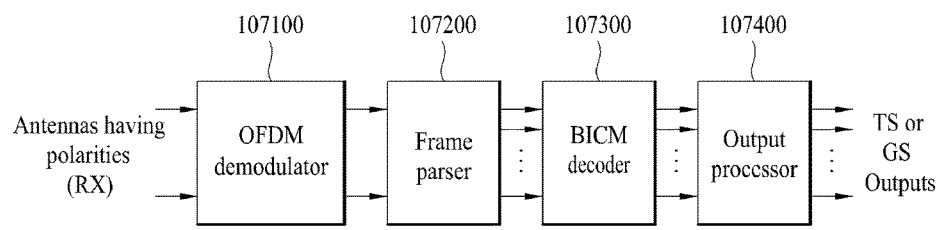
FIG. 2 shows a broadcast signal receiver according to an embodiment of the present invention.

FIG. 2 shows a broadcast signal receiver according to an embodiment of the present invention.

As shown in FIG. 2, the broadcast signal receiver may include an OFDM demodulator 107100, a frame parser 107200, a BICM decoder 107300, and an output processor 107400. The OFDM demodulator 107100 may convert signals received through a plurality of receive antennas into signals in the frequency domain. The frame parser 107200 may output PLPs for a necessary service from among the converted signals. The BICM decoder 107300 may correct an error generated according to a transmission channel. The output processor 107400 may perform procedures necessary to generate output TSs or GSs. Here, dual polarity signals may be input as input antenna signals and one or more streams may be output as the TXs or GSs.

Figure 3:
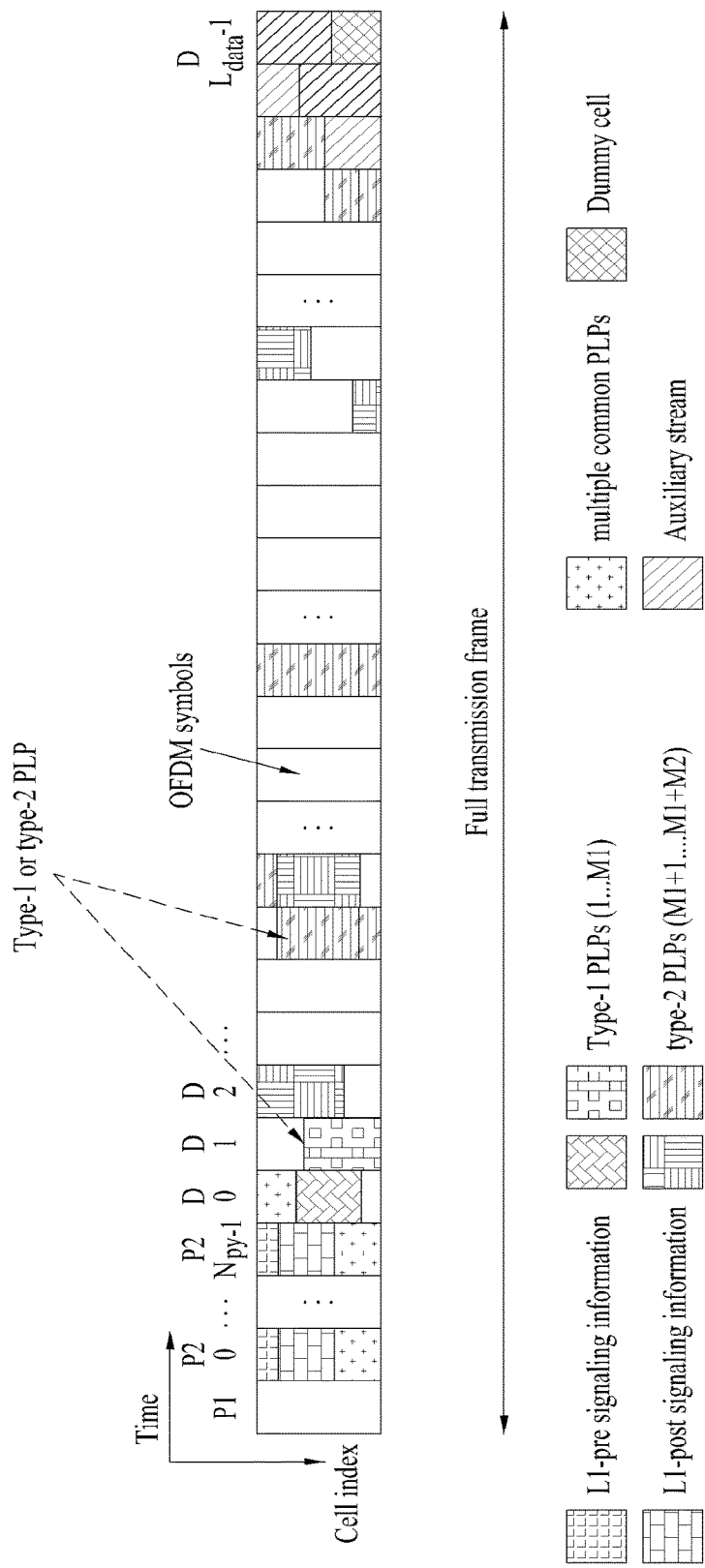
FIG. 3 shows an additional frame structure based on PLP according to an embodiment of the present invention.

FIG. 3 shows an additional frame structure based on PLP according to an embodiment of the present invention.

As shown in FIG. 3, a frame according to an embodiment of the present invention may include a preamble area and a data area. The preamble area may include a P1 symbol and a P2 symbol and the data area may include a plurality of data symbols. The P1 symbol may transmit P1 signaling information and P2 symbol may transmit L1-signaling information.

In this case, a preamble symbol may be additionally allocated to the preamble. This additional preamble symbol is referred to as an Additional Preamble 1 (AP1). In an embodiment of the present invention, one or more AP1 symbols may be added to a frame in order to improve detection performance of a mobile broadcast signal under very low SNR or time-selective fading conditions. AP1 signaling information transmitted through the AP1 symbol may include an additional transmission parameter.

AP1 signaling information according to an embodiment of the present invention includes pilot pattern information in a frame. Thus, according to an embodiment of the present invention the broadcast signal receiver does not transmit P2 symbol, if L1 signaling information is spread in data symbols of the data area, pilot pattern information can be discovered by using the AP1 signaling information before L1 signaling information in the data area is decoded.

Also, if the L1-signaling information in the data area of a frame is spread, AP1 signaling information can include information necessary for the broadcast signal receiver to decode signaling information spread in a frame of the data area. According to the present invention, a preamble area of a frame includes a P1 symbol, more than one AP1 symbols, and more than one P2 symbols. And the data area comprises a plurality of data symbols, also known as data OFDM symbol. A P2 symbol is optional and whether it is inserted is determined by signaling AP1 signaling information through AP1 symbols according to an embodiment of the present invention.

In an embodiment of the present invention, a P1 insertion module in the OFDM generator OFDM generator 101500 of the broadcast signal transmitter may insert the P1 symbol and the AP1 symbol into every symbol. That is, the P1 insertion module may insert 2 or more preamble symbols into every frame. In another embodiment, an AP1 insertion module may be added downstream of (or next to) the P1 insertion module and the AP1 insertion module may insert the AP1 symbol. If 2 or more preamble symbols are used as in the present invention, there are advantages in that robustness to burst fading that may occur in a mobile fading environment is further increased and signal detection performance is also improved.

The P1 symbol may transmit P1 signaling information associated with a basic transmission parameter and transmission type and a corresponding preamble identifier and the receiver may detect the frame using the P1 symbol. A plurality of P2 symbols may be provided and may carry L1 signaling information and signaling information such as a command PLP. The L1 signaling information may include L1 pre signaling information and L1-post signaling information, the L1-pre signaling information may include information necessary to receive and decode the L1-post signaling information. Also, the L1-post signaling information may include parameters necessary for the receiver to encode PLP data.

As shown in FIG. 3, the L1-post signaling information may be located next to L1-pre signaling information.

The L1-post signaling information may include a configurable block, a dynamic block, an extension block, a cyclic redundancy check (CRC) block, and an L1 padding block.

The configurable block may include information equally applied to one transmission frame and the dynamic block may include characteristic information corresponding to a currently transmitted frame.

The extension block may be used when the L1-post signaling information is extended, and the CRC block may include information used for error correction of the L1-post signaling information and may have 32 bits. The padding block may be used to adjust sizes of information respectively included in a plurality of encoding blocks to be equal when the L1-post signaling information is transmitted while being divided into the encoding blocks and has a variable size.

The common PLP may include network information such as a NIT (Network Information Table) or PLP information and service information such as an SDT (Service Description Table) or an EIT (Event Information Table). The preamble of the present invention may include only the P1 symbol, the L1-pre signaling information, and the L1-post signaling information or may include all of the P1 symbol, the L1-pre signaling information, the L1-post signaling information, and the common PLP according to designer intention. A plurality of data symbols located next to the P1 symbol may include a plurality of PLPs. The plurality of PLPs may include audio, video, and data TS streams and PSI/SI information such as a Program Association Table (PAT) and a Program Map Table (PMT). In the present invention, a PLP that transmits PSI/SI information may be referred to as a base PLP or a signaling PLP. The PLPs may include a type-1 PLP that is transmitted through one sub-slice per frame and a type-2 PLP that is transmitted through two sub-slices per frame. The plurality of PLPs may transmit one service and may also transmit service components included in one service. When the PLPs transmit service components, the transmitting side may transmit signaling information which indicates that the PLPs transmit service components. In addition, additional data (or an enhanced broadcast signal) in addition to basic data may be transmitted through a specific PLP while sharing an RF frequency band with the conventional terrestrial broadcast system according to an embodiment of the present invention. In this case, the transmitting side may define a system or a signal that is currently transmitted through signaling information of the P1 symbol described above. The following description is given with reference to the case in which the additional data is video data. That is, as shown in FIG. 3, PLP M1 112100 and PLP (M1+M2) 112200 which are type 2 PLPs may be transmitted while including additional video data. In addition, in the present invention, a frame that transmits such additional video data may be referred to as an additional frame and a frame that transmits basic data may be referred to as a basic frame (or T2 frame).

In addition, a frame that can transmit not only additional data but also data associated with a new broadcast system different from the conventional terrestrial broadcast system may be referred to as an additional frame. In this case, a frame that transmits a conventional terrestrial broadcast may be referred to as a terrestrial broadcast frame and an additional frame may transmit additional data or basic data associated with the new broadcast system.

Figure 4:
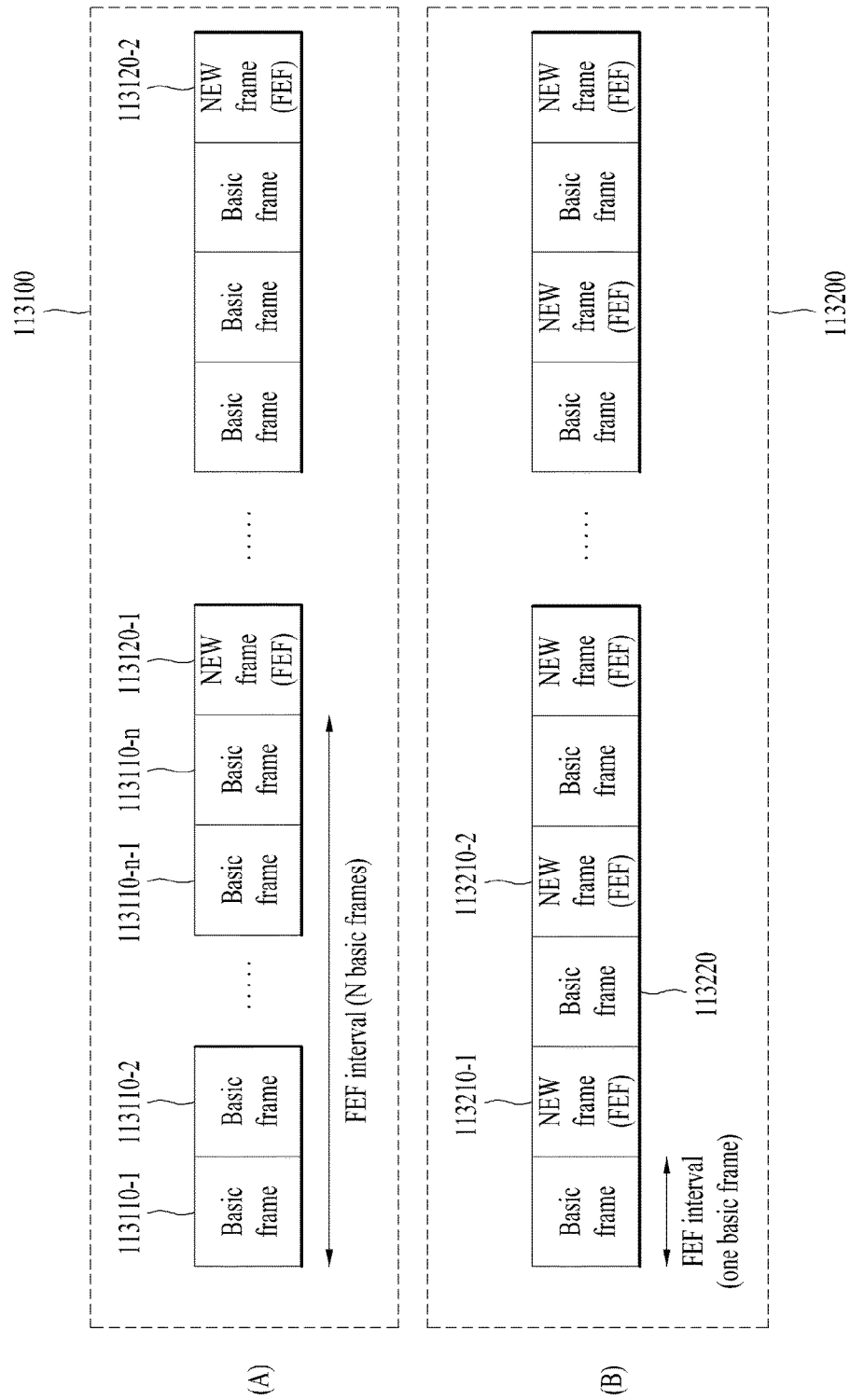
FIG. 4 shows an additional frame structure based on FEF according to an embodiment of the present invention.

FIG. 4 illustrates a structure of an additional frame based on FEF according to an embodiment of the present invention.

Specifically, FIG. 4 shows the case in which a Future Extension Frame (FEF) is used in order to transmit additional video data. In the present invention, a frame that transmits basic video data may be referred to as a basic frame and an FEF that transmits additional video data may be referred to as an additional frame.

FIG. 4 shows structures of superframes 11100 and 113200 in each of which a basic frame and an additional frame are multiplexed. Frames 113100-1 to 113100-$n$ that are not shaded from among frames included in the superframe 113100 are basic frames and shaded frames 113120-1 and 113120-2 are additional frames.

FIG. 4(A) shows the case in which the ratio of basic frames to additional frames is N:1. In this case, the time required for the receiver to receive a next additional frame 113120-2 after receiving one additional frame 113120-1 may correspond to N basic frames.

FIG. 4(B) shows the case in which the ratio of basic frames to additional frames is 1:1. In this case, the proportion of additional frames in the superframe 113200 may be maximized and therefore the additional frames may have a structure very similar to that of the basic frames in order to maximize the extent of sharing with the basic frames. In addition, in this case, the time required for the receiver to receive a next additional frame 113210-2 after receiving one additional frame 113210-1 corresponds to 1 basic frame 113220 and therefore the superframe period is shorter than that of FIG. 4(A).

Figure 5:
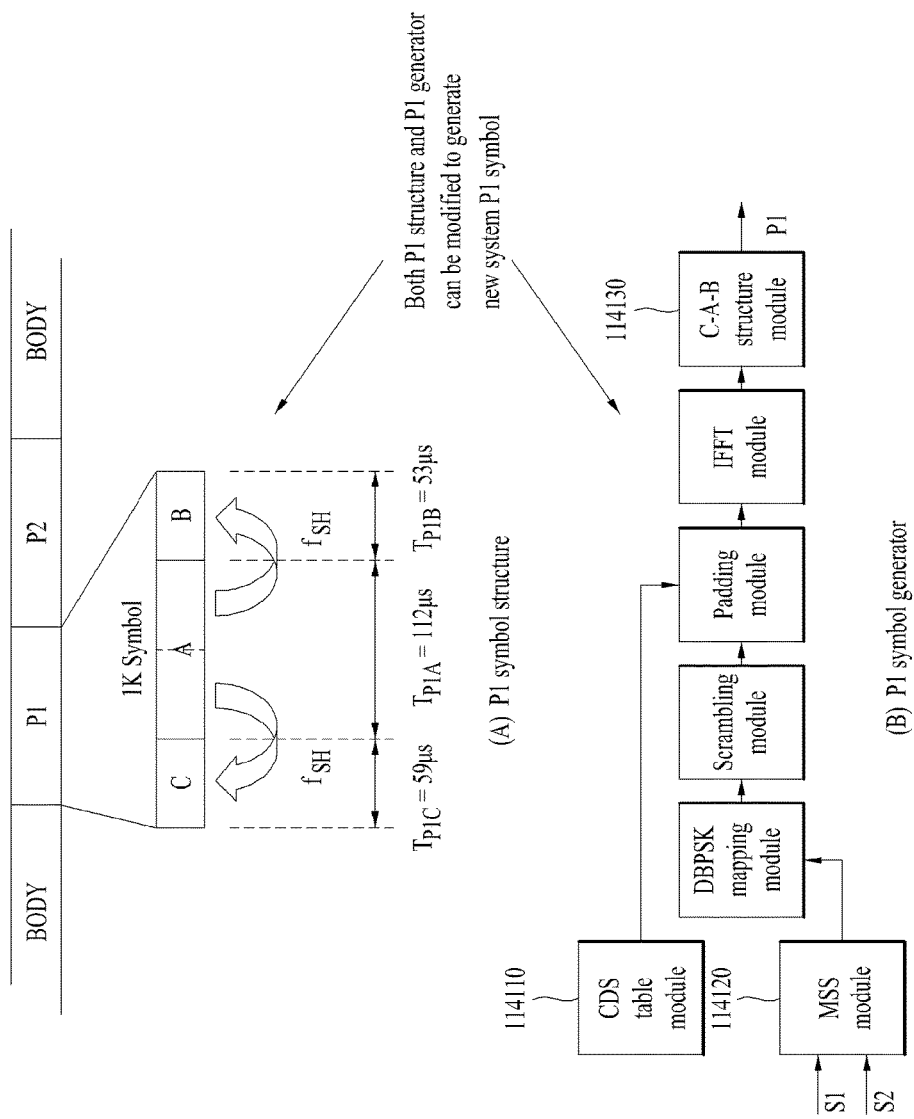
FIGS. 5 A and B show a process of generating a P1 symbol in order to perceive an additional frame according to an embodiment of the present invention.

FIGS. 5(A) and 5(B) illustrate a P1 symbol generation procedure for identifying additional frames according to an embodiment of the present invention.

In the case in which additional video data is transmitted through additional frames which are distinguished from basic frames as shown in FIG. 4, there is a need to transmit additional signaling information for enabling the receiver to identify and process an additional frame. An additional frame of the present invention may include a P1 symbol for transmitting such additional signaling information and the P1 symbol may be referred to as a new_system_P1 symbol. This new_system_P1 symbol may be different from a P1 symbol that is used in a conventional frame and a plurality of new_system_P1 symbols may be provided. In an embodiment, the new_system_P1 symbol may be located before a first P2 symbol in a preamble area of the frame.

In the present invention, a P1 symbol of a conventional frame may be modified and used to generate the minimum Hamming distance. The present invention suggests a method in which a minimum Hamming distance is generated by modifying the structure of the P1 symbol of the conventional frame or is generated by changing the symbol generator 114100 that generates symbols.

FIG. 5(A) shows the structure of the P1 symbol of the conventional frame. In the present invention, the structure of the P1 symbol of the conventional frame shown in FIG. 5(A) may be modified to generate a minimum Hamming distance. In this case, the minimum Hamming distance may be generated by changing a frequency displacement f_SH for the prefix and postfix of the conventional P1 symbol or changing the length (specifically, the size of T_P1C or T_P1B) of the P1 symbol. However, in the case in which the minimum Hamming distance is generated by modifying the structure of the P1 symbol, there is a need to appropriately modify parameters (the sizes of TP_P1C and T_P1B and f_SH) used in the P1 symbol structure.

FIG. 5(B) shows the P1 symbol generator that generates P1 symbols. In the present invention, the P1 symbol generator shown in FIG. 5(B) may be modified to generate a minimum Hamming distance. In this case, a minimum Hamming distance may be generated using a method which changes the distribution of active carriers used for a P1 symbol in a CDS table module 114110, an MSS module 114120, and a C-A-B structure module 114130 included in the P1 symbol generator (for example, a method in which the CDS table module 114110 uses a different Complementary Set of Sequence (CSS)) or a method which changes a pattern for information that is transmitted through a P1 symbol (for example, a method in which the MSS module 114120 uses a different Complementary Set of Sequence (CSS)).

In addition, the AP1 symbol of the present invention described above with reference to FIG. 3 may be generated through the procedure described above with reference to FIG. 5.

In addition, the present invention proposes a MIMO system using scalable video coding (SVC). SVC is a video coding method developed to cope with a variety of terminals and communication environments and variations in the terminals and communication environments. SVC can code a video hierarchically such that desired definition is generated and transmit additional video data having a base layer from which video data about an image having basic definition can be restored and an enhancement layer from which an image having higher definition can be restored. Accordingly, a receiver can acquire the basic definition image by receiving and decoding only the video data of the base layer, or obtain the higher definition image by decoding the video data of the base layer and the video data of the enhancement layer according to characteristics thereof. In the following description, the base layer can include video data corresponding to the base layer and the enhancement layer can include video data corresponding to the enhancement layer. In the following, video data may not be a target of SVC, the base layer can include data capable of providing a fundamental service including basic video/audio/data corresponding to the base layer, and the enhancement layer can include data capable of providing a higher service including higher video/audio/data corresponding to the enhancement layer.

The present invention proposes a method of transmitting the base layer of SVC through a path through which signals can be received according to SISO or MISO using SVC and transmitting the enhancement layer of SVC through a path through which signals can be received according to MIMO in the broadcast system of the present invention. That is, the present invention provides a method by which a receiver having a single antenna acquires an image with basic definition by receiving the base layer using SISO or MISO and a receiver having a plurality of antennas acquires an image with higher definition by receiving the base layer and the enhancement layer using MIMO.

A description will be given of a method of transmitting the MIMO broadcast data including the base layer and the enhancement layer in association with terrestrial broadcast frames for transmitting terrestrial broadcast signals.

(1) Method of Transmitting MIMO Broadcast Data Using Predetermined PLP

It is possible to transmit the MIMO broadcast data included in a predetermined PLP while distinguishing the predetermined PLP from a PLP including terrestrial broadcast data. In this case, the predetermined PLP is used to transmit the MIMO broadcast data, and signaling information for describing the predetermined PLP may be additionally transmitted to prevent an error in the conventional receiving system. In the following, the predetermined PLP including the MIMO broadcast data may be referred to as a MIMO broadcast PLP and the PLP including the terrestrial broadcast data may be referred to as a terrestrial broadcast PLP.

As MIMO broadcast data may not be implemented in a terrestrial broadcast receiver, it is necessary to have additional information for signalling to distinguish terrestrial PLP and MIMO broadcast PLP. In this case, signaling can use a reserved field in the L1 signaling information of the terrestrial broadcast system. When a plurality of antennas are used for transmitting MIMO broadcast data on the transmitting side, the terrestrial broadcast data can be transmitted by MISO. The present invention, in order to perceive PLP, utilizes L1-post signaling information.

(2) Method of Transmitting MIMO Broadcast Data Using Predetermined frame

It is possible to include the MIMO broadcast data generated as described above in a predetermined frame and to transmit the predetermined frame including the MIMO broadcast data while distinguishing the predetermined frame from a terrestrial broadcast frame. In this case, the predetermined frame is used to transmit the MIMO broadcast data, and signaling information for describing the predetermined frame may be additionally transmitted to prevent an error in the conventional receiving system.

(3) Method of Transmitting MIMO Broadcast PLP Using Terrestrial Broadcast Frame and MIMO Broadcast Frame PLPs including MIMO broadcast data may be transmitted through a terrestrial broadcast frame and a MIMO broadcast frame. Since a MIMO broadcast PLP may be present in the terrestrial broadcast frame (or basic frame), distinguished from the above-mentioned embodiments, it is necessary to signal the relationship between connected PLPs present in the terrestrial broadcast frame and the MIMO broadcast frame. To achieve this, the MIMO broadcast frame may also include L1 signaling information, and information about the MIMO broadcast PLP present in the broadcast frame may be transmitted along with L1 signaling information of the terrestrial broadcast frame.

MIMO broadcast PLP data in different frames are connected by using PLP fields including L1-post signaling information. According to an embodiment of the present invention, the receiving system includes as L1-post signaling information PLP_ID information, PLP+TYPE information, PLP_PAYLOAD_TYPE information, PLP_GROYP_ID information, uses those information to check the PLP connection between MIMO broadcast PLP data. It then acquires services by continuously decoding desired MIMO broadcast PLP data.

The terrestrial broadcast PLP in the terrestrial broadcast frames can be transmitted as a preset mode and also as mentioned a new mode to support the MIMO system can be transmitted. According to an embodiment of the present invention, the MIMO broadcast PLP in the terrestrial broadcast frames as a base layer can be transmitted by MISO or SISO method and MIMO broadcast PLP in MIMO broadcast frames as an enhancement layer can be transmitted by the MIMO method.

Figure 6:
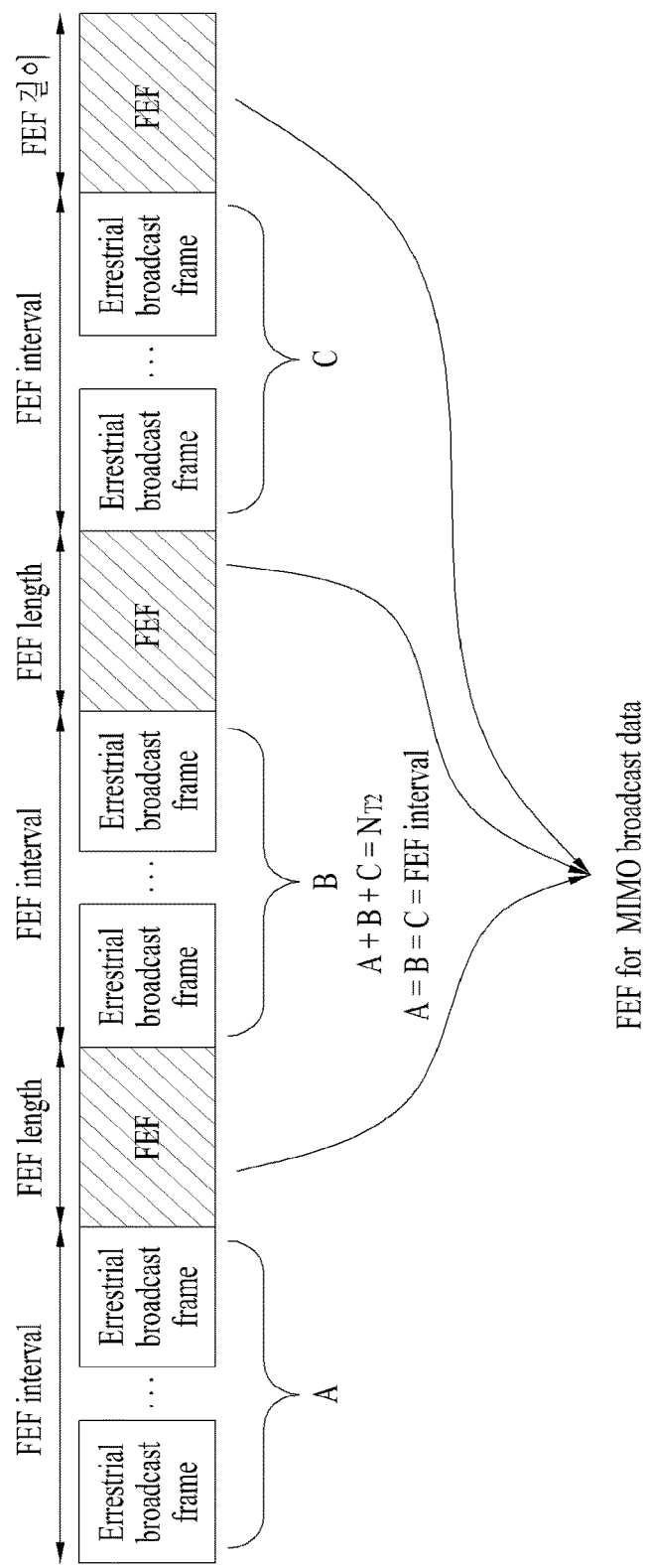
FIG. 6 shows a conceptual diagram of a broadcast signal transmitting method according to an embodiment of the present invention.

FIG. 6 shows a conceptual diagram for a method of transmitting broadcast signals.

As shown in FIG. 6, terrestrial broadcast data and MIMO broadcast data in frame units can be distinctively transmitted. The FEF length of a MIMO broadcast frame (FEF) can be allocated in between terrestrial broadcast frames in an FEF interval. In this case, MIMO system data can co-exist in a frequency band within the terrestrial broadcast system, and malfunction can be prevented by the broadcast signal receiver perceiving a frame through L1 signaling and ignoring MIMO broadcast frames. In that case, the MIMO system can use some of the thruput by FEF related parameters such as FEF_TYPR, FEF_LENGTH, FEF_INTERVAL defined by the L1-post signaling information.

Figure 7:
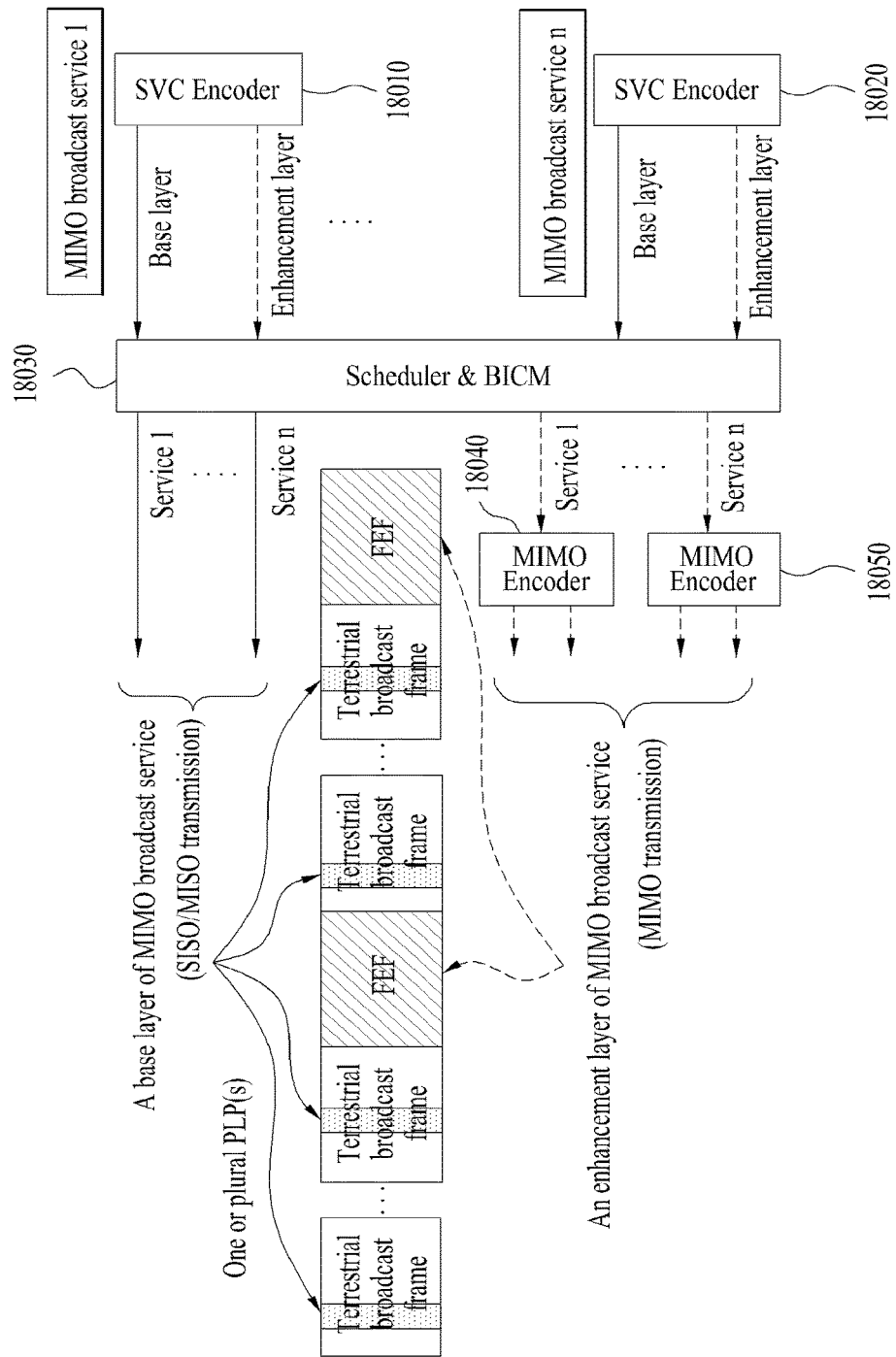
FIG. 7 shows a conceptual diagram of a broadcast signal transmitting method according to another embodiment of the present invention.

FIG. 7 shows a conceptual diagram for a broadcast signal transmitting method according to another embodiment of the present invention.

FIG. 7 indicates, as shown in the method 3, transmitting the broadcast signals of the MIMO broadcast system in terrestrial broadcast system. The MIMO broadcast services (MIMO broadcast service 1~n) encodes each SVC encoder (18010, 18020) through a base layer and enhancement layer. Scheduler&BICM (Bit Interleaved Coding and Modulation) module (18030) allocates the base layers of the MIMO broadcast services with the terrestrial broadcast frames and the enhancement layers with MIMO encoders (18040, 18050). The enhancement layers encodes by each MIMO encoder (18040, 18050) and transmits to the MIMO broadcast frame of the MIMO broadcast system. The base layers are transmitted in the terrestrial broadcast frames and in that case, SISO or MISO supported by the terrestrial broadcast system.

When broadcast signals including the terrestrial broadcast frames and the MIMO broadcast frames, as mentioned in the method 1 and 3, signaling information is created and the terrestrial broadcast receiver perceives terrestrial broadcast PLP in the terrestrial broadcast frames. Thus, the receiver can acquire the terrestrial broadcast services without malfunctioning. Also, the MIMO broadcast receiver can acquire and provide the MIMO broadcast service corresponding to the base layer only by the terrestrial broadcast frame. It can acquire and provide the MIMO broadcast service corresponding to the base layer and enhancement layer by acquiring the MIMO broadcast PLP of the terrestrial broadcast frame and MIMO broadcast frame of the MIMO broadcast frame.

The MIMO broadcast PLP in the terrestrial broadcast frame can only be transmitted by MISO/MIMO. In that case, the MIMO broadcast PLP, as the system demands, can include a code rate of new error correction codes (such as 1/4, 1/3, 1/2), and new time interleaving mode and can only transmit to a base layer.

The MIMO broadcast PLP of the MIMO broadcast frame includes PLP of the SISO, MISO, and MIMO methods. In that case, PLP of the SISO/MISO methods or a base layer in a carrier can be transmitted and PLP of the MIMO method or the carrier can transmit the enhancement layer. The rate of PLP of the SISO/MISO methods, or carrier and PLP of the MIMO method, or carrier can be varied from 0 to 100%. The ract can be determined for each frame accordingly.

Figure 8:
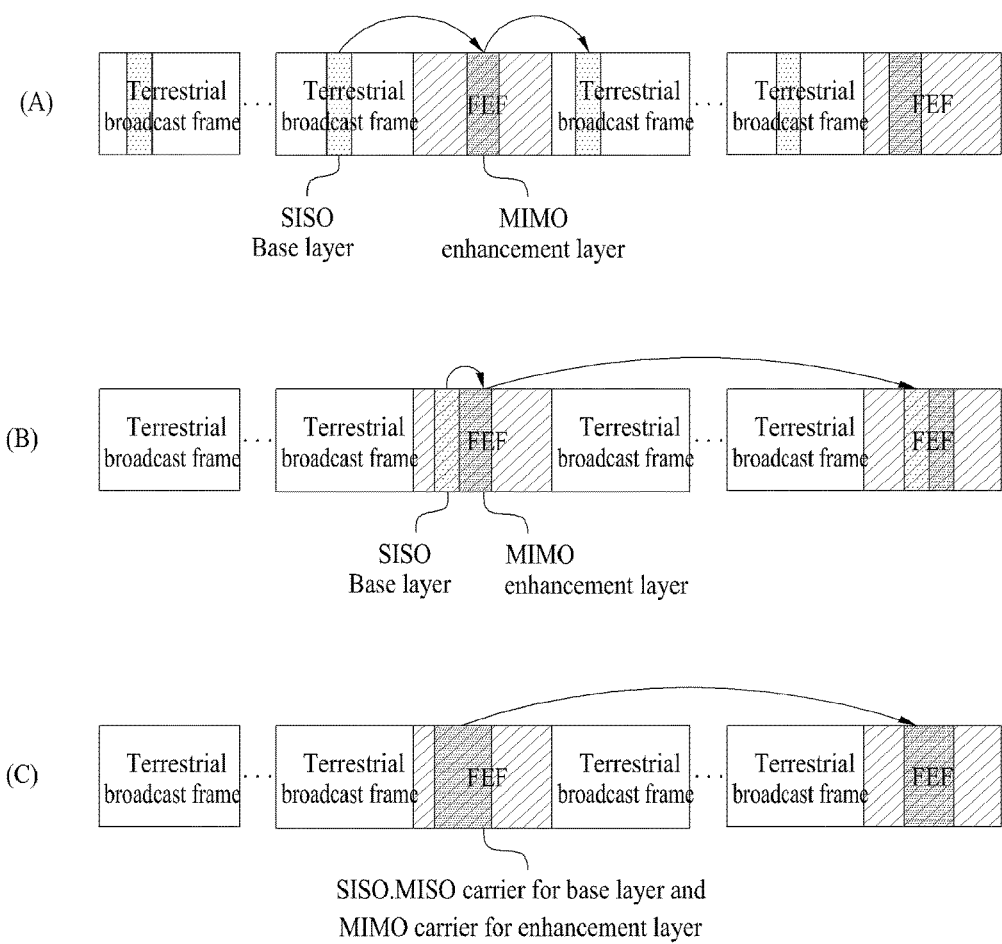
FIG. 8 shows a broadcast signal transmitted by a national broadcast system with a MIMO system applied using SVC.

FIG. 8 shows broadcast signals transmitted by a broadcast system being applied by a MIMO system using a SVC.

FIG. 8 shows a broadcast signal that allocates terrestrial data and MIMO broadcast data to a frame or PLP by using the SVC and generating a base and enhancement layer.

FIG. 8 A shows a broadcast signal transmitted by a broadcast system being applied by a MIMO transmitting system by using the SVC.

The broadcast system in FIG. 8 A transmits broadcast signals including a terrestrial broadcast frame and MIMO broadcast frame. The MIMO broadcast PLP in FIG. 8 A can exist in a terrestrial broadcast frame or a MIMO broadcast frame. The MIMO broadcast PLP in the terrestrial broadcast frame as a base layer can be transmitted by the SISO or MISO method and the MIMO broad cast PLP in the MIMO broadcast frame as an enhancement layer can be transmitted by the SISO, MISO, or MIMO method.

FIG. 8 B shows a broadcast signal being applied by a MIMO transmitting system using a SVC.

In FIG. 8 B, the broadcast system transmits broadcast signals including the terrestrial broadcast frame and the MIMO broadcast frame. The MIMO broadcast PLP in FIG. 8 B only exists in the MIMO broadcast frame. In that case, the MIMO broadcast PLP includes PLP with a base layer and PLP with an enhancement layer. The PLP with the base layer can be transmitted by the SISO or MISO method, and the PLP with the enhancement layer can be transmitted by the SISO, MISO, or MIMO method. The rate of the PLP with base layer and the PLP with enhancement layer can be varied from 0 to 100%.

FIG. 8 C shows a broadcast signal transmitted by a broadcast system being applied by a MIMO transmitting system using a SVC.

The broadcast system of FIG. 8 C transmits broadcast signals including terrestrial broadcast frames and MIMO broadcast frames. The MIMO broadcast data exists only in the MIMO broadcast frame. But, as opposed to FIG. 8 B, a base layer and an enhancement layer are not transmitted by PLP but carriers.

Various technologies are introduced to improve transmission efficiency and perform robust communication in a digital broadcast system. One of the technologies is a method of using a plurality of antennas at a transmitting side or a receiving side. This method may be divided into SISO (Single-Input Single-Output), SIMO (Single-Input Multi-Output), MISO (Multi-Input Single-Output) and MIMO (Multi-Input Multi-Output). While multiple antennas are described as two antennas in the following, the present invention is applicable to systems using two or more antennas.

In an embodiment, MIMO can use spatial multiplexing (SM) and Golden code (GC) schemes, which will be described in detail.

A modulation scheme in broadcast signal transmission may be represented as M-QAM (Quadrature Amplitude Modulation) in the following description. That is, BPSK (Binary Phase Shift Keying) can be represented by 2-QAM when M is 2 and QPSK (Quadrature Phase Shift Keying) can be represented by 4-QAM when M is 4. M can indicate the number of symbols used for modulation.

A description will be given of a case in which a MIMO system transmits two broadcast signals using two transmit antennas and receives two broadcast signals using two receive antennas as an example.

Figure 9:
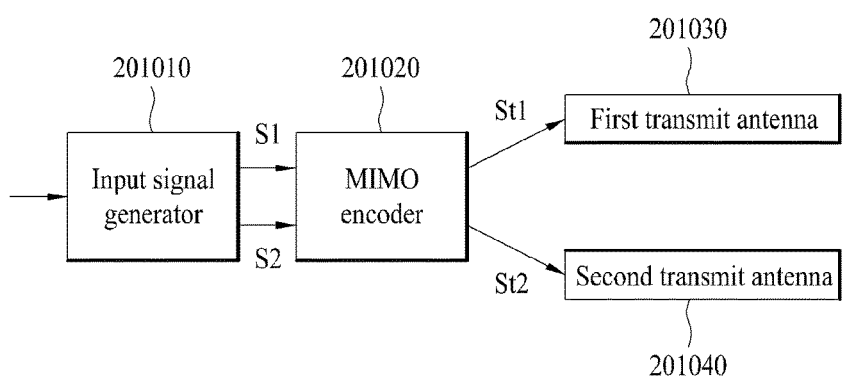
FIG. 9 shows a MIMO transmitting/receiving system according to an embodiment of the present system.

FIG. 9 illustrates MIMO transmission and reception systems according to an embodiment of the present invention.

As shown in FIG. 9, the MIMO transmission system includes an input signal generator 201010, a MIMO encoder 201020, a first transmit antenna 201030, and a second transmit antenna 201040. In the following, the input signal generator 201010 may be referred to as a divider and the MIMO encoder 201020 may be referred to as a MIMO processor.

Although not shown in the drawings, the MIMO reception system may include a first receive (Rx) antenna, a second receive (Rx) antenna, a MIMO decoder, and an output signal generator. In the following description, the output signal generator may also be referred to as a merger and the MIMO decoder may also be referred to as an ML detector.

In the MIMO transmission system, the input signal generator 201010 generates a plurality of input signals for transmission through a plurality of antennas. In the following, the input signal generator 201010 may be referred to as a divider. Specifically, the input signal generator 201010 may divide an input signal for transmission into 2 input signals and output the first input signal S1 and the second input signal S2 for MIMO transmission.

The MIMO encoder 201020 may perform MIMO encoding on the plurality of input signals S1 and S2 and output a first transmission signal St1 and a second transmission signal St2 for MIMO transmission and the output transmission signals may be transmitted through a first antenna 201030 and a second antenna 201040 via required signal processing and modulation procedures. The MIMO encoding 201020 may perform encoding on a per symbol basis. The SM scheme or the GC scheme may be used as the MIMO encoding method. In the following, the MIMO encoder may be referred to as a MIMO processor. Specifically, the MIMO encoder may process a plurality of input signals according to a MIMO matrix and a parameter value of the MIMO matrix which are described below.

The input signal generator 201010 is an element that outputs a plurality of input signals for MIMO encoding and may also be an element such as a demultiplexer or a frame builder depending on the transmission system. The input signal generator 201010 may also be included in the MIMO encoder 201020 such that the MIMO encoder 201020 generates a plurality of input signals and performs encoding on the plurality of input signals. The MIMO encoder 201020 may be a device that performs MIMO encoding or MIMO processing on a plurality of signals and outputs the encoded or processed signals so as to acquire diversity gain and multiplexing gain of the transmission system.

Since signal processing should be performed on a plurality of input signals after the input signal generator 201010, a plurality of devices may be provided next to the input signal generator 201010 to process signals in parallel or one device including one memory may be provided to sequentially process signals or to simultaneously process signals in parallel.

The MIMO reception system receives a first reception signal Sr1 and a second reception signal Sr2 using a first receive antenna and a second receive antenna. The MIMO decoder 201070 then processes the first reception signal and the second reception signal and outputs a first output signal and a second output signal. The MIMO decoder 201070 processes the first reception signal and the second reception signal according to the MIMO encoding method used by the MIMO encoder 201020. As an ML detector, the MIMO decoder 201070 outputs a first output signal and a second output signal using information regarding the channel environment, reception signals, and the MIMO matrix used by the MIMO encoder in the transmission system. In an embodiment, when ML detection is performed, the first output signal and the second output signal may include probability information of bits rather than bit values and may also be converted into bit values through FEC decoding.

The MIMO decoder of the MIMO reception system processes the first reception signal and the second reception signal according to the QAM type of the first input signal and the second input signal processed in the MIMO transmission system. Since the first reception signal and the second reception signal received by the MIMO reception system are signals that have been transmitted after being generated by performing MIMO encoding on the first input signal and the second input signal of the same QAM type or different QAM types, the MIMO reception system may determine a combination of QAM types of the reception signals to perform MIMO decoding on the reception signals. Accordingly, the MIMO transmission system may transmit information identifying the QAM type of each transmission signal in the transmission signal and the QAM type identification information may be included in a preamble portion of the transmission signal. The MIMO reception system may determine the combination of the QAM types of the reception signals from the QAM type identification information of the transmission signals and perform MIMO decoding on the reception signals based on the determination.

The following is a description of a MIMO encoder and a MIMO encoding method that have low system complexity, high data transmission efficiency, and high signal reconstruction (or restoration) performance in various channel environments according to an embodiment of the present invention.

The SM scheme is a method in which data is simultaneously transmitted through a plurality of antennas without MIMO encoding. In this case, the receiver can acquire information from data that is simultaneously received through a plurality of receive antennas. The SM scheme has an advantage in that the complexity of a Maximum Likelihood (ML) decoder that the receiver uses to perform signal reconstruction (or restoration) is relatively low since the decoder only needs to check a combination of received signals. However, the SM scheme has a disadvantage in that transmit diversity cannot be achieved at the transmitting side. In the case of the SM scheme, the MIMO encoder bypasses a plurality of input signals. In the following, such a bypass process may be referred to as MIMO encoding.

The GC scheme is a method in which data is transmitted through a plurality of antennas after the data is encoded according to a predetermined rule (for example, according to an encoding method using golden code). When the number of the antennas is 2, transmit diversity is acquired at the transmitting side since encoding is performed using a 2×2 matrix. However, there is a disadvantage in that the complexity of the ML decoder of the receiver is high since the ML decoder needs to check 4 signal combinations.

The GC scheme has an advantage in that it is possible to perform more robust communication than using the SM scheme since transmit diversity is achieved. However, such a comparison has been made when only the GC scheme and the SM scheme are used for data processing for data transmission and, if data is transmitted using additional data coding (which may also be referred to as outer coding), transmit diversity of the GC scheme may fail to yield additional gain. This failure easily occurs especially when such outer coding has a large minimum Hamming distance. For example, the transmit diversity of the GC scheme may fail to yield additional gain compared to the SM scheme when data is transmitted after being encoded by adding redundancy for error correction using a Low Density Parity Check (LDPC) code having a large minimum Hamming distance. In this case, it may be advantageous for the broadcast system to use the SM scheme having low complexity.

Figure 10:
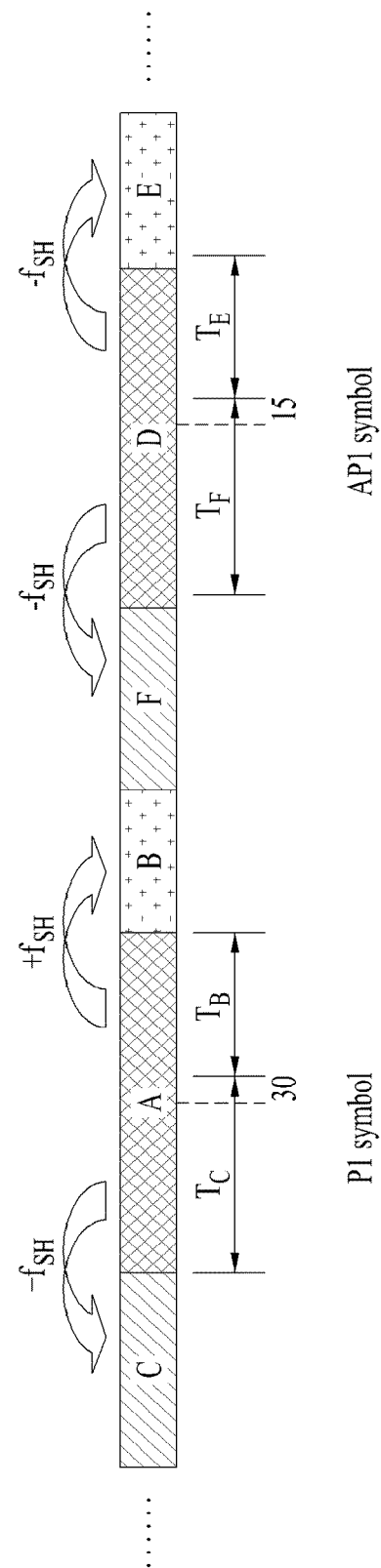
FIG. 10 shows a structure of a P1 symbol and AP1 symbol according to an embodiment of the present invention.

FIG. 10 shows an exemplary structure of a P1 symbol and an exemplary structure of an AP1 symbol according to an embodiment of the present invention.

P1 symbol is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In the same manner, AP1 symbol is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined. And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C,B,F,E lengths according to the present invention may be obtained by using Equation 1 shown below.

Length of $C(T_C)$={Length of $A(T_A)$/2+30}

Length of $B(T_B)$={Length of $A(T_A)$/2−30}

Length of $E(T_F)$={Length of $D(T_D)$/2+15}

Length of $E(T_E)$={Length of $D(T_D)$/2−15}    [Expression 1]

As shown in Equation 1, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A $(T_A)$/2. And, in order to determine the lengths of F and E, the present invention determines an offset value being added to or subtracted from a value corresponding to the length of D $(T_D)$/2. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 10, and by inserting the generated symbols to each signal frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the signal frame and may then be transmitted. And, in case the P1 symbol and AP1 symbol are each allocated to a different position within the signal frame, so as to be transmitted, a high time diversity effect may be gained with respect to the preamble symbol. According to the embodiment of the present invention, the P1 symbol and the API symbol are consecutively transmitted. In that case, the AP1 symbol, according to FIG. 3, transmits information necessary for decoding signaling information spread in a pilot pattern or a frame of a data area. It can be generated in FIG. 5.

Figure 11:
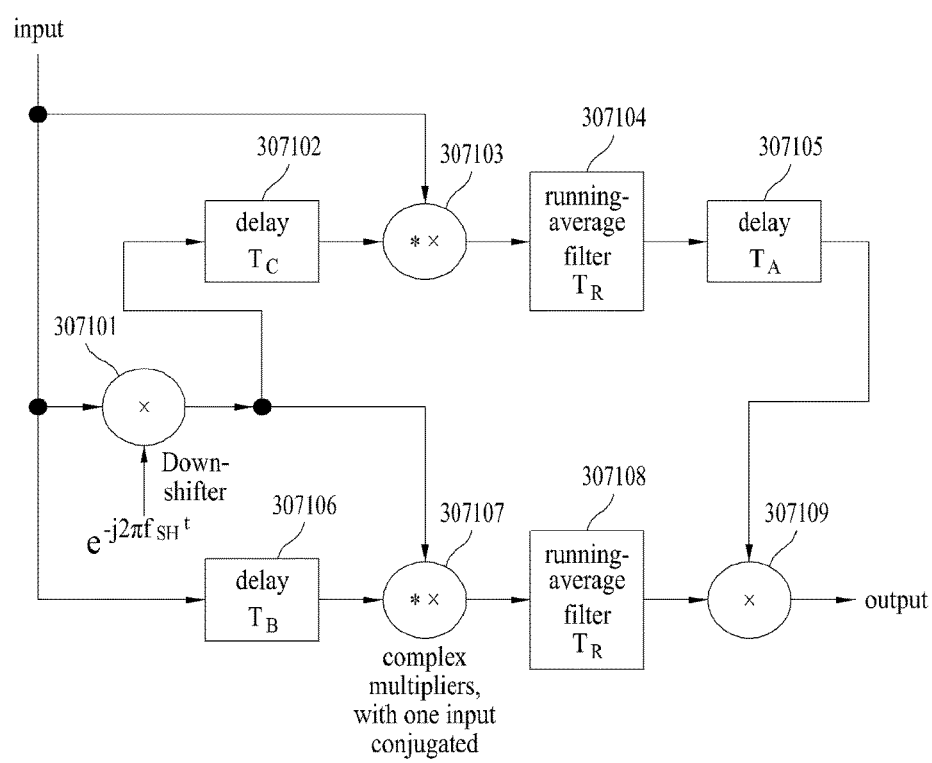
FIG. 11 shows a P1 symbol detection module according to an embodiment of the present invention.

FIG. 11 shows an exemplary structure of a P1 symbol detector according to an embodiment of the present invention.

The P1 symbol detector may be included in the OFDM demodulator (107100) explained in FIG. 2.

Herein, the P1 symbol detector may also be referred to as a C-A-B preamble detector. The P1 symbol detector may include down shifter (307101), $1^{st}$ conjugator (307103) and $2^{nd}$ delayer (307106).

The down shifter (307101) performs inverse modulation by multiplying $e^{-j2\pi f_{SH} t}$ by the input signal. When inverse modulation is performed by the down shifter (307101), the signal being frequency-shifted and inputted is recovered to the original signal. The inverse modulated signal may be outputted to a $1^{st}$ delayer (307102) and a $2^{nd}$ conjugator (307107).

The $1^{st}$ delayer (307102) delays the inverse-modulated signal by a length of part C ($T_C$) and then outputs the delayed signal to the $1^{st}$ conjugator (307103). The $1^{st}$ conjugator (307103) performs complex-conjugation on the signal, which is delayed by a length of part C ($T_C$). Then, the $1^{st}$ conjugator (307103) multiplies the input signal by the complex-conjugated signal, thereby outputting the processed signal to a $1^{st}$ filter (307104). The $1^{st}$ filter (307104) uses a running average filter having the length of $T_R=T_A$, so as to remove (or eliminate) any excessively and unnecessarily remaining modulation elements, thereby outputting the processed signal to a $3^{rd}$ delayer (307105). The $3^{rd}$ delayer (307105) delays the filtered signal by a length of part A (i.e., effective (or valid) symbol) ($T_A$), so as to output the delayed signal to a multiplier (307109).

The $2^{nd}$ delayer (307106) delays the input signal by a length of part B ($T_B$) and then outputs the delayed signal to the $2^{nd}$ conjugator (307107). The $2^{nd}$ conjugator (307107) performs complex-conjugation on the signal, which is delayed by a length of part B ($T_B$). Then, the $2^{nd}$ conjugator (307107) multiplies the complex-conjugated signal by an inverse-modulated signal, thereby outputting the processed signal to a $2^{nd}$ filter (307108). The $2^{nd}$ filter (307108) uses a running average filter having the length of $T_R=T_A$, so as to remove (or eliminate) any excessively and unnecessarily remaining modulation elements, thereby outputting the processed signal to the multiplier (307109).

The multiplier (307109) multiplies the output of the $2^{nd}$ filter (307109) by a signal, which is delayed by a length of part A ($T_A$). Thus, a P1 symbol may be detected from each signal frame of the received broadcast signal.

Herein, the length of part C ($T_C$) and the length of part B ($T_B$) may be obtained by applying Equation 1 shown above.

Figure 12:
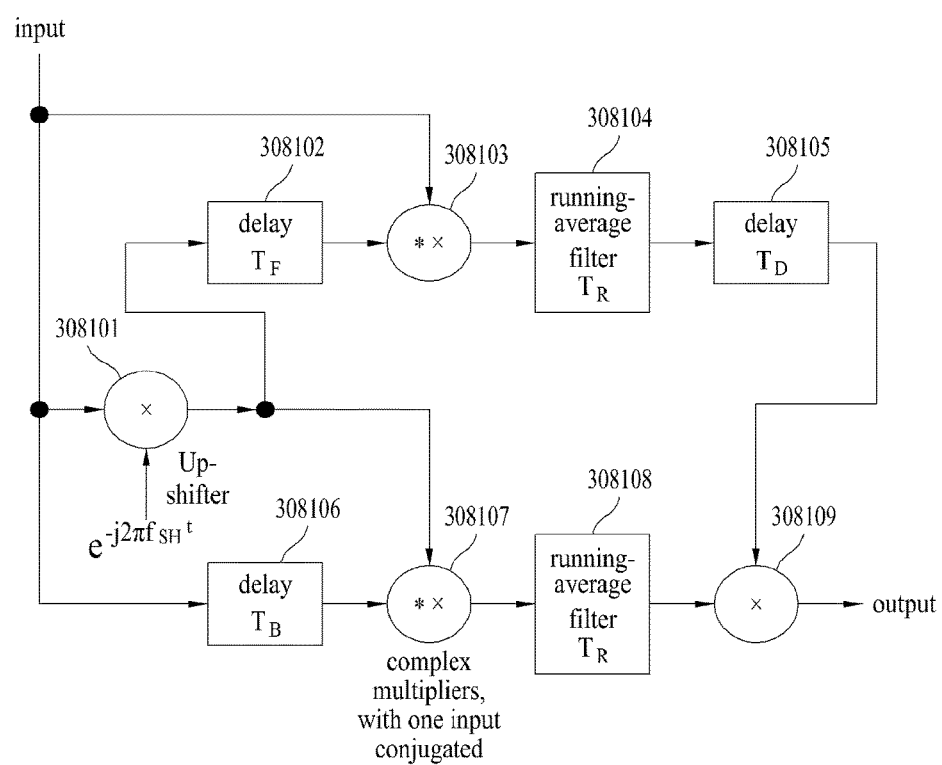
FIG. 12 shows an AP1 symbol detection module according to an embodiment of the present invention.

FIG. 12 shows an exemplary structure of an AP1 symbol detector according to an embodiment of the present invention.

The AP1 symbol detector may be included in the OFDM demodulator (107100) explained in FIG. 2.

Herein, the AP1 symbol detector may also be referred to as an F-D-E preamble detector. The AP1 symbol detector may include down shifter (308101), 1$^{st}$ conjugator (308103) and 2$^{nd}$ delayer (308106). The AP1 symbol detector may receive a signal inputted to broadcast signal receiver or a signal outputted from the P1 symbol detector explained in FIG. 11.

The up-shifter (308101) performs inverse modulation by multiplying $e^{j2\pi f_{SH}}$ by the input signal. When inverse modulation is performed by the up-shifter (308101), the signal being frequency-shifted and inputted is recovered to the original signal. More specifically, the up-shifter (308101) of FIG. 47 has the same structure as the down-shifter (307101) of the P1 symbol detector (306601). However, the frequency direction of each inverse modulation process is completely opposite to one another. The signal that is inverse modulated by the up-shifter (308101) may be outputted to a 1$^{st}$ delayer (308102) and a 2$^{nd}$ conjugator (308107).

The 1$^{st}$ delayer (308102) delays the inverse-modulated signal by a length of part F ($T_F$) and then outputs the delayed signal to the 1$^{st}$ conjugator (308103). The 1$^{st}$ conjugator (308103) performs complex-conjugation on the signal, which is delayed by a length of part F ($T_F$). Then, the 1$^{st}$ conjugator (308103) multiplies the input signal by the complex-conjugated signal, thereby outputting the processed signal to a 1$^{st}$ filter (308104). The 1$^{st}$ filter (308104) uses a running average filter having the length of $T_R=T_D$, so as to remove (or eliminate) any excessively and unnecessarily remaining modulation elements, thereby outputting the processed signal to a 3$^{rd}$ delayer (308105). The 3$^{rd}$ delayer (308105) delays the filtered signal by a length of part D (i.e., effective (or valid) symbol) ($T_D$), so as to output the delayed signal to a multiplier (308109).

The 2$^{nd}$ delayer (308106) delays the input signal by a length of part E ($T_E$) and then outputs the delayed signal to the 2$^{nd}$ conjugator (308107). The 2$^{nd}$ conjugator (308107) performs complex-conjugation on the signal, which is delayed by a length of part E ($T_E$). Then, the 2$^{nd}$ conjugator (308107) multiplies the complex-conjugated signal by an inverse-modulated signal, thereby outputting the processed signal to a 2$^{nd}$ filter (308108). The 2$^{nd}$ filter (308108) uses a running average filter having the length of $T_R=T_D$, so as to remove (or eliminate) any excessively and unnecessarily remaining modulation elements, thereby outputting the processed signal to the multiplier (308109).

The multiplier (308109) multiplies the output of the 2$^{nd}$ filter (308109) by a signal, which is delayed by a length of part D ($T_D$). Thus, an AP1 symbol may be detected from each signal frame of the received broadcast signal. Herein, the length of part F ($T_F$) and the length of part E ($T_E$) may be obtained by applying Equation 1 shown above.

As shown in FIG. 3, a frame according to an embodiment of the present invention comprises a preamble area and a data area. The preamble are comprises a P1 and P2 and there can be a plurality of data symbols in the data area. Also, as the designer intends, there can be an AP1 in the preamble area.

Then, P1 signaling information is transmitted by the P1 symbol, the AP1 signaling information is transmitted by the AP1 symbol, and L1-pre and L1-post signaling information is transmitted by the P2 symbol.

An embodiment of a broadcast signal transmitter or receiver for MIMO processing is as follows.

The broadcast signal transmitter comprises as shown in FIG. 1 an input processor 101200, a BICM encoder 101300, a frame builder 101400, and an OFDM generator 101500. Also, the broadcast signal receiver, as shown in FIG. 2, comprises an OFDM demodulator 107100, a frame demapper 107200, a BICM decoder 107300, and an output processor 1073400.

The input processor 101200 of the broadcast signal transmitter executes FEC encoding for transmitting data in a form of block. The BICM encoder 101300 performs encoding for correcting errors. The frame builder 101400 performs mapping data in a frame, and the OFDM generator 101500 performs OFDM demodulating in the frame-mapped data into symbol units and transmit the data. Devices in the broadcast signal receiver can perform reverse-functioning corresponding to the counterpart devices in the transmitter.

The present invention suggests a broadcast signal transmitter or receiver that independently applies MISO or MIMO processing for each PLP from a plurality of PLP inputs. According to the present invention, the present invention can effectively adjust the quality of service (QOS) or services from PLP in a physical layer.

Four embodiments for performing MISO/MISO processing in a plurality of signals from the transmitter and receiver through a plurality of antennas are as follows. Individual embodiments can be distinguished from each other according to whether MISO/MIMO processing for each PLP is processed or according to the position of MISO/MIMO processing. A brief description of individual embodiments is as follows.

A first embodiment is about a broadcast signal transmitter or a corresponding receiver independently performing MISO or MIMO processing for each PLP data input during a BICM encoding process.

A second embodiment is about another broadcast signal transmitter or a corresponding receiver independently performing MISO or MIMO processing for each PLP data input during a BICM encoding process.

A third embodiment is about a broadcast signal transmitter or a corresponding receiver independently performing MISO or MIMO processing for mapped PLP data input during a OFDM generating process.

A fourth embodiment is about a broadcast signal transmitter or a corresponding receiver independently performing MISO or MIMO processing for each PLP data input during a BICM encoding process, wherein an OFDM generator performs MISO processing in MISO PLP data and L1-signaling information.

In more detail, the BICM encoder of the broadcast signal transmitter according to the first embodiment performs MISO encoding or MIMO encoding in PLP data after constellation-mapping, cell interleaving, and time interleaving. Also, the BICM decoder of the broadcast signal transmitter according to the first embodiment can reverse the whole process. According to the second embodiment, the BICM encoder of the broadcast signal transmitter according to the second embodiment performs MISO encoding or MIMO encoding in PLP data after constellation-mapping, and then performs cell interleaving and time interleaving. Also, the BICM decoder of the broadcast signal transmitter according to the second embodiment can reverse the whole process.

According to the third embodiment, the OFDM generator of the broadcast signal transmitter performs MISO or MIMO encoding in PLP data transmitted from a frame builder. In addition, an OFDM demodulator of the broadcast signal receiver according to a third embodiment of the present invention may perform a reverse process of the OFDM generator of the broadcast transmitter.

According to the fourth embodiment, the BICM encoder of the broadcast signal transmitter according to the fourth embodiment performs MISO encoding or MIMO encoding in PLP data after time interleaving or constellation-mapping. Also, the OFDM generator of the broadcast signal transmitter performs MISO encoding in MISO PLP data for MISO processing and L1-signaling information. The BICM decoder of the broadcast signal receiver and the OFDM demodulator of the broadcast signal transmitter according to the fourth embodiment can reverse the whole process.

A broadcast signal transmitter/receiver according to each embodiment is as follows. The broadcast signal transmitter/receiver can perform MIMO processing for a plurality of signals through a plurality of antennas. The broadcast signal transmitter/receiver with two signals by two antennas is described below.

Figure 13:
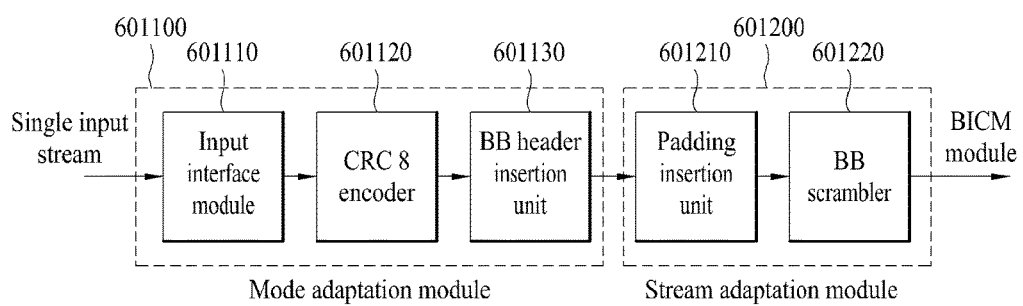
FIG. 13 shows an input processor of a broadcast signal transmitter according to an embodiment of the present invention.
Figure 14:
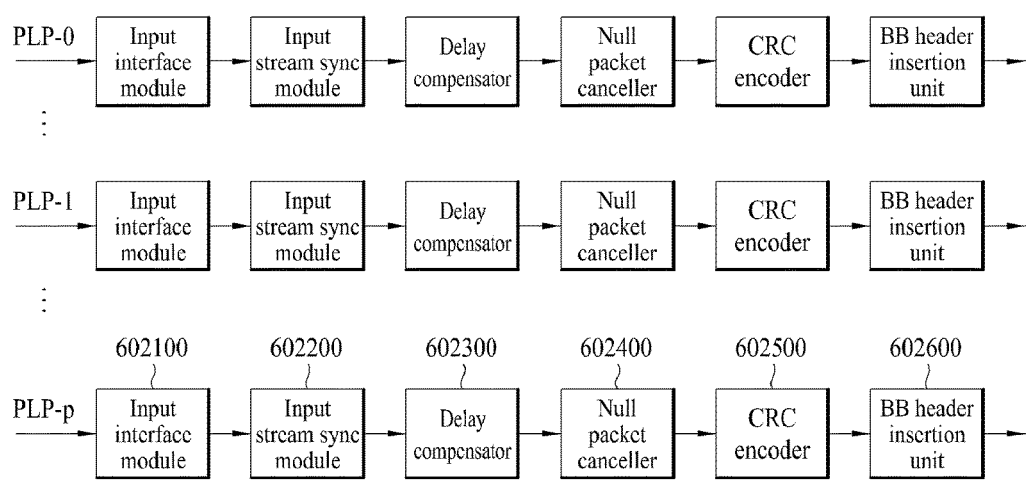
FIG. 14 shows a mode adaption module implementing a plurality of PLP as an input processor according to an embodiment of the present invention.

FIG. 13 and FIG. 14 show an input process that the broadcast signal transmitter comprises in common. Further description is as follows.

FIG. 13 shows an input processor of the broadcast signal transmitter according to an embodiment.

The input process 101200 in FIG. 1 is shown as an embodiment in FIG. 13 performing only one PLP. The input processor in FIG. 13 comprises a mode adaptation module 601100 and a stream adaptation module 601200. The mode adaptation module 601100 further comprises an input interface module 601110, a CRC-8 encoder 601120 and a BB header insertion module 601130, wherein a stream adaptation module 1020 comprises a padding insertion module 601210 and a BB scrambler 601220.

The input interface module 601110 in the input processor performing a single PLP performs mapping by distinguishing the input bit stream in a logical unit to perform FEC (BCH/LDPC) encoding at the end of the BICM encoder. The CRC-9 encoder 601120 performs CRC encoding in the mapped bit stream and a BB header insertion module 1050 inserts a BB header in the data field. In that case, the BB header includes all adaptation type (TS/GS/IP) information, user packet length information, and data field length.

Also, if the input data does not have a BB frame for FEC encoding, the stream adaptation block 601200 generates a padding insertion unit and a Pseudo Random Binary Sequence (PRBS) and includes a BB scrambler 601220 randomizing data computed by the PRBS and XOR. Such a move by the BB scrambler 601220 can ultimately lower the Peak-to-Average Power Ratio of the OFDM-modulated signal.

FIG. 14 shows a mode adaptation module implementing a plurality of PLP as an input processor according to an embodiment of the present invention.

FIG. 14 shows a mode adaptation module as an input processor of the broadcast signal transmitter performing a plurality of PLP. The mode adaptation module in FIG. 14 comprises a plurality of input interface modules 602100 performing mode adaptation for each PLP in parallel, an input stream synchronizer 602200, a compensating delay module 602300, null packet deletion module 602400, a CRC-0 encoder 602500, and a BB header insertion unit 602600. The description of the input interface module 6021000, the CRC-8 encoder 602500 and the BB header insertion unit 602600 is omitted.

The input stream synchronizer 602200 inserts timing information necessary for restoring input stream clock reference information (ISCR), transport stream (TS) or generic stream (GS). The compensating delay module 602300 synchronizes a group of PLP based on the timing information. The null packet deletion module (602400) deletes null packet that is unnecessarily transmitted and inserts the number of the deleted null packets based on the deleted position.

Figure 15:
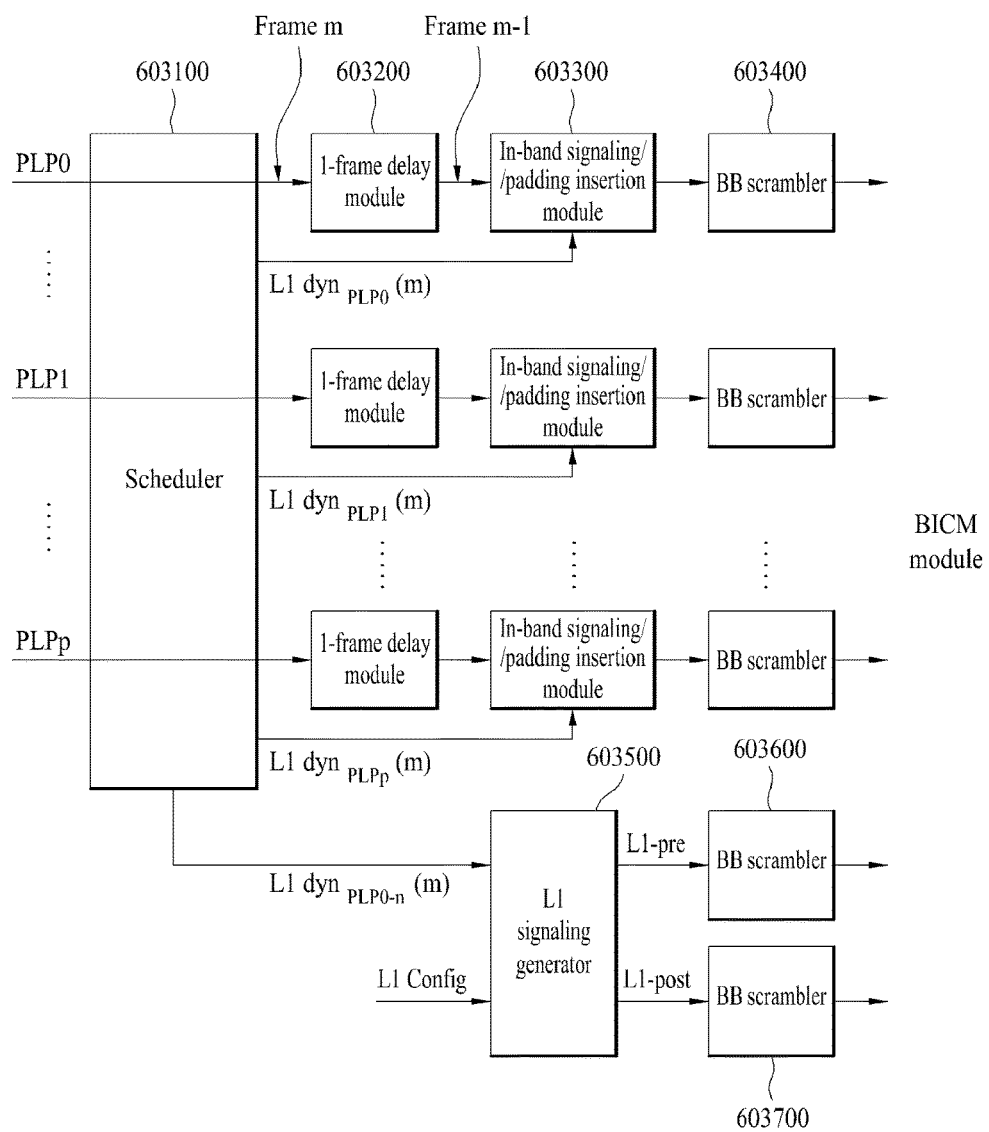
FIG. 15 shows a stream adaption module implementing a plurality of PLP as an input processor according to an embodiment of the present invention.

FIG. 15 shows a stream adaptation module implementing a plurality of PLP as an input processor according to an embodiment of the present invention.

The stream adaptation module in FIG. 17 receives PLP-based data in which mode adaptation of FIG. 14 was performed from the mode adaptation module of FIG. 14, such that it can perform stream adaptation as shown in the following description.

The scheduler 603100 performs scheduling for the MIMO transmitting system using a plurality of antennas including dual polarity and generates parameters for a demultiplexer, a cell interleaver, a time interleaver. Also, the scheduler 603100 transmits L1-dynamic signaling information for the current frame besides in-band signaling, and performs cell mapping based on the scheduling.

Figure 29:
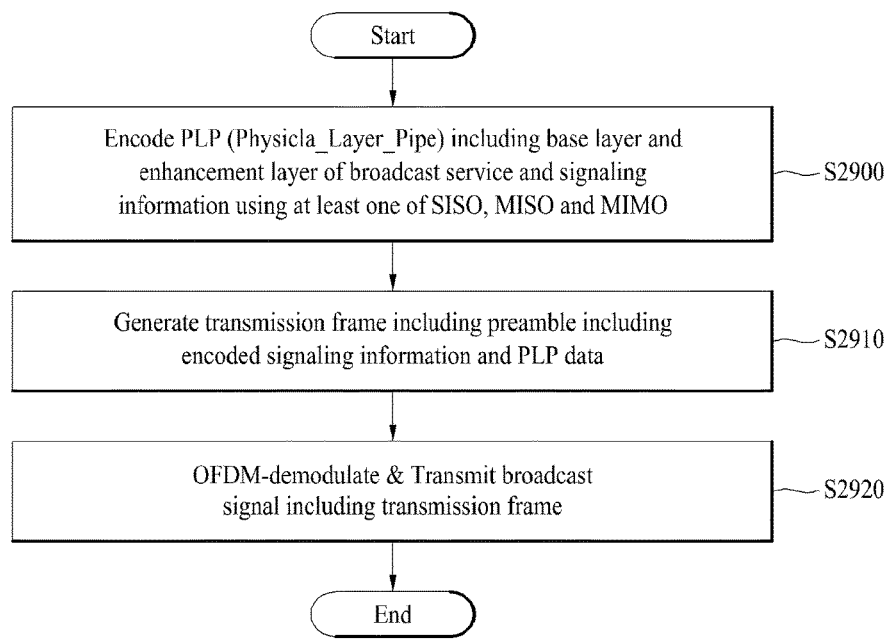
FIG. 29 is a flowchart illustrating a method for transmitting a broadcast signal according to an embodiment of the present invention.

A plurality of a 1-frame delay module 603200 executing a plurality of PLP delays one frame so that scheduling information of the next frame for in-band signaling can be included in the current frame. A plurality of in-band signaling/padding insertion module inserts L1-dynamic signaling information to the delayed data. Also, if there is any room for padding, the in-band signaling/padding insertion module 603300 inserts padding bits and in-band signaling information into the padding area. And, the BB scrambler 603400 generates a pseudo random binary sequence (PRBS) as shown in FIG. 29 and randomizes the data by computing the PRBS with XOR.

The stream adaption module in FIG. 15 generates L1-signaling information transmitted by the preamble symbol of the frame or the spread data symbol. Such L1-signaling information includes L1-pre signaling information and L1-post signaling information. The L1-pre signaling information includes parameters necessary for performing the L1-post signaling information and static L1-signaling information, and the L1-post signaling information includes the static L1-signaling information and dynamic L1-signaling information. The L1-signaling generator 603500 can transmit the generated L1-pre signaling information and L1-post signaling information. The transmitted L1-pre signaling information and L1-post signaling information is scrambled by each BB scramble 603600, 603700. Also, according to another embodiment, the L1 signaling generator 603500 transmits L1-signaling information having L1-pre signaling and L1-post signaling information and scrambles L1-signaling information transmitted by one BB scrambler.

FIG. 16 to FIG. 19 shows a structure block of a broadcast signal transmitter according to an embodiment. Further description is as follows.

Figure 16:
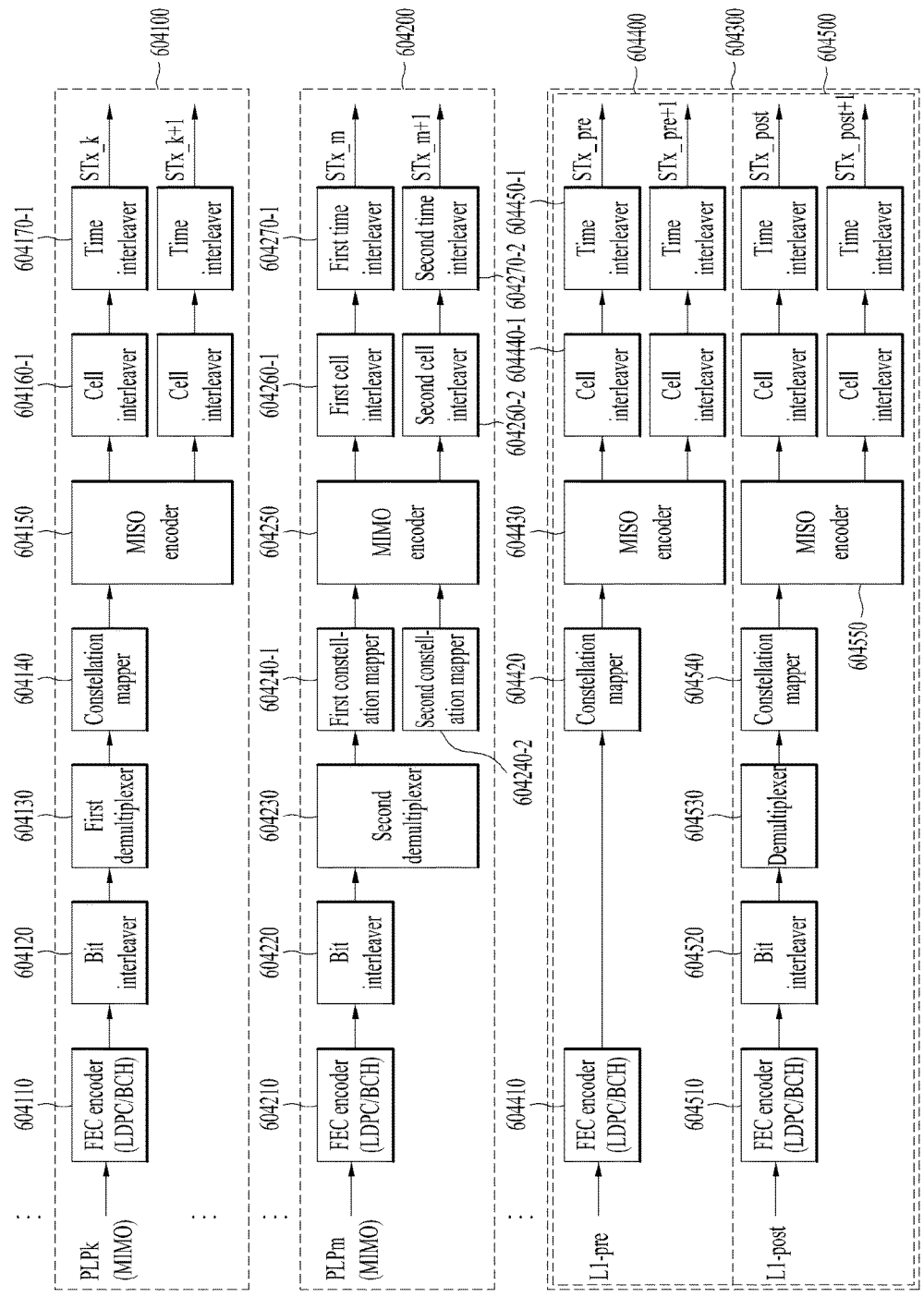
FIG. 16 shows a BICM encoder according to an embodiment of the present invention.

FIG. 16 shows a BICM encoder according to an embodiment of the present invention.

The BICM encoder shown in FIG. 16 is an embodiment of the BICM encoder 101300 in FIG. 1.

The BICM encoder according to the first embodiment performs bit-interleaving in a plurality of PLP data after performing input-processing, L1-pre signaling information, and L1-post signaling information, and encoding for correcting errors.

Also, the BICM encoder independently performs MISO or MIMO encoding in PLP data. In addition, the BICM encoder according to a first embodiment of the present invention may perform MISO encoding and MIMO encoding upon completion of constellation mapping.

The BICM encoder in FIG. 16 includes a first BICM encoding block 607100 performing MISO encoding in PLP data, a second BICM encoding block 607200 performing MIMO encoding in PLP data, and a third BICM encoding block 607300 performing MIMO encoding in signaling information. The third BICM encoding block 604300 performing MIMO encoding in signaling information. However, as the signaling information includes information necessary for restoring PLP data in a frame from the receiver, more robustness is required between the transmitter and receiver compared to PLP data. Thus, an embodiment of the present invention is the MISO process performing the signaling information. The description of data performing process for each block is as follows.

First, the first BICM encoding block 604100 includes a BICM encoder 604100, a FEC (Forward Error Correction) encoder 604110, a bit-interleaver 604120, a first demultiplexer 604130, a constellation mapper 604140, a MISO encoder 604150, a cell interleaver 604160-1,604160-2 and a time interleaver 604170-1, 604170-2.

The FEC encoder 604110 performs BCH encoding and LDPC encoding in PLP data after performing input processing with redundancy to correct channel errors from the receiver. The bit-interleaver 604120 prepares to have robustness for bust errors by performing bit-interleaving in the FEC-encoded PLP data by each FEC block unit. In that case, the bit interleaver can perform bit interleaving by using two FEC block units. When using two FEC blocks, a pair of cell units may be generated from two different FEC blocks in the frame-builder. Thus, the broadcast signal receiver may improve the reception by ensuring the diversity of FEC blocks.

A first demultiplexer 604130 can perform demultiplexing in the bit-interleaved PLP data into one FEC block unit. In that case, the first demultiplexer 604130 uses two FEC blocks and performs demultiplexing. When using the two blocks, pairs of cells in the frame builder may be generated from different FEC blocks. Thus, the receiver can improve reception by ensuring the diversity of FEC blocks.

The constellation mapper 604140 performs mapping in the bit-demultiplexed PLP data into symbol units. In that case, the constellation mapper 604140 can rotate a certain angle depending on the modulation type. The rotated constellation mappers can be expressed in I-phase (In-phase) and Q-phase (Quadrature-phase), and the constellation mappers can delay only the Q-phase for a certain value. Then, the constellation mapper 604140 performs re-mapping in the In-phase element with the delayed Q-phase element.

The MISO encoder 604150 performs MISO encoding by using MISO encoding matrix in the time-interleaved PLP data and transmits MISO PLP data through two routes (STx_k, STx_k+1). The present invention includes an OSTBC (Orthogonal Space-Time Block Code)/OSFBC(Orthogonal Space Frequency Block Code/Alamouti code) as an embodiment of a MISO encoding method.

The cell interleaver 604160-1, 604160-2 performs interleaving in the re-mapped data into cell units, and the time interleaver 604170-1, 604170-2 performs interleaving in the cell-interleaved PLP data into time units. In that case, the time interleaver 604160 uses two FEC blocks for interleaving. Through this process, as pairs of cells are generated from two different FEC blocks, the receiver can improve reception by ensuring the diversity of the FEC blocks.

The second BICM encoding block 604200 includes a FEC encoder 604210, a bit-interleaver 604220, a second demultiplexer 604230, a first constellation mapper 604240-1 and a second constellation mapper 604240-2, and a MIMO encoder 604250, a first cell interleaver 604260-1 and a second interleaver 604260-2, and a first time interleaver 604270-1 and a second cell interleaver 604270-2.

The FEC encoder 604210 and the bit-interleaver 604220 can perform the same function as the FEC encoder 604110 and the bit-interleaver 604120 of the MISO method.

The second demultiplexer 604230 can transmit the PLP data by demultiplexing to two routes necessary for MIMO transmission in addition to performing the same function as the first demultiplexer 604130 of the MISO method. In that case, the character of the data transmission for each route may be different. Thus, the second demultiplexer can randomly allocate the bit-interleaved PLP data into each route.

The first constellation mapper 604240-1 and the second constellation mapper 604240-2 can operate the same function as the constellation mapper 604140 of the MISO method.

The MIMO encoder 604270 performs MIMO encoding in the time-interleaved PLP data from by using MIMO encoding matrix and transmit MIMO PLP data to two routes (STx_m, STx_m+1). The MIMO encoding matrix of the present invention includes a spatial multiplexing, a Golden code (GC), a full-rate full diversity code, and a linear dispersion code.

The first cell interleaver 604260-1 and the second cell interleaver 604260-2 can perform cell-interleaving in only a half of the PLP data in one of the FEC blocks from the routes. Thus, the first cell interleaver 604260-1 and second cell interleaver 604260-2 can operate the same as the one cell interleaver. Also, in order to execute data from a plurality of routes, as the first cell interleaver 604260-1 and the second cell interleaver 604260-2 are not allocated additional memory, there is an advantage of performing cell interleaving by using the memory of the one cell interleaver.

The first time interleaver 604270-1 and the second time interleaver 604270-2 can operate the same as the time interleaver 604170-1, 604170-2 of the MISO method. In that case, the first time interleaver 604270-1 and the second time interleaver 604270-2 can be performed the same time interleaving or a different time interleaving.

L1-signaling information includes L1-pre signaling information and L1-post signaling information. It can independently perform MISO encoding in the L1-pre signaling information and L1-post signaling information.

Thus, the third BICM encoding block 604300 includes a first encoding block 604400 executing the L1-pre signaling information and the second encoding block 604500 executing the L1-post signaling information.

The first encoding block 604400 includes an FEC encoder 604410, a constellation mapper 604420, a MISO encoder 604430, cell interleavers 604440-1, 604440-2, and time interleavers 604450-1, 604450-2. The second encoding block 604500 includes a FEC encoder 604510, a bit interleaver 604520, demultiplexer 604530, a constellation mapper 604540, a MISO encoder 604560, cell interleavers 604560-1, 604560-2, and time interleavers 604570-1, 604570-2.

The L1-pre signaling information includes information necessary for decoding L1-post signaling information and the L1-post signaling information includes information necessary for restoring data transmitted from the receiver.

That is, the receiver needs to decode the L1-pre signaling information quickly and correctly for decoding the L1-signaling information and the data. Thus, the receiver of the present invention does not perform bit-interleaving and de-multiplexing for the L1-pre signaling information in order to perform the fast decoding.

The description of first encoding block 604400 and the second encoding block 604500 is omitted because they perform the same function as the first BICM block 604100.

As a result, to execute the L1-pre signaling information, the first encoding block 604400 performs MISO encoding in the L1-pre signaling information and transmits the free-signaling data to two routes (STx_pre, STx_pre+1). Also, to execute L1-post signaling information the second encoding block 604500 performs MISO encoding in the L1-post signaling information and transmits the L1-post signaling data to two routes (STx_post, STx_post+1).

Figure 17:
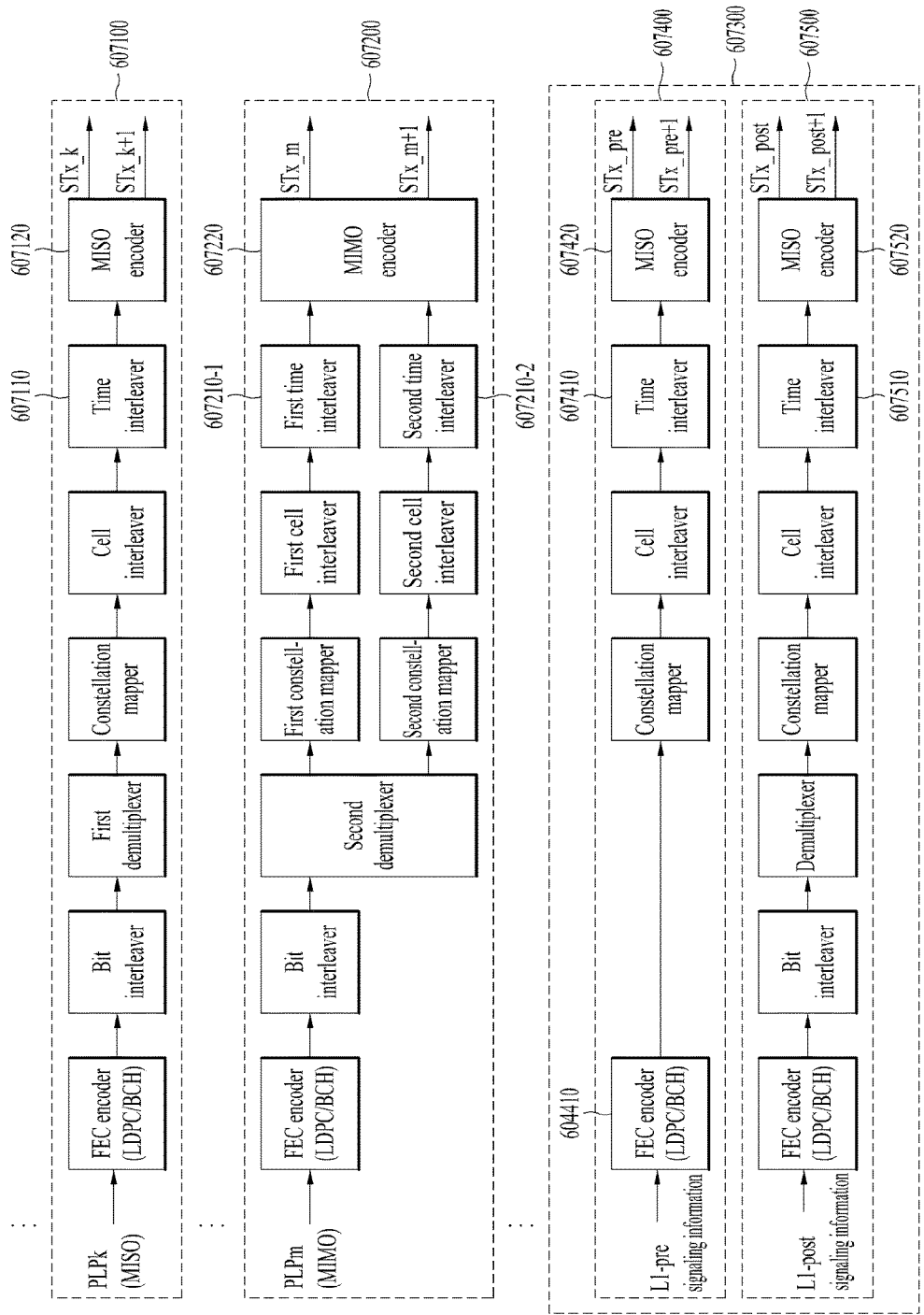
FIG. 17 shows a BICM encoder according to another embodiment of the present invention.

FIG. 17 shows a BICM encoder according to another embodiment of the present invention.

The BICM encoder shown in FIG. 17 according to the second embodiment is another embodiment of the BICM encoder 101300 in FIG. 1.

The BICM encoder according to the second embodiment performs bit-interleaving in a plurality of PLP data after performing input-processing, L1-pre signaling information, and L1-post signaling information, and encoding for correcting errors.

Also, the BICM encoder independently performs MISO and MIMO encoding in PLP data.

The BICM encoder in FIG. 17 includes a first BICM encoding block 607100 performing MISO encoding in PLP data, a second BICM encoding block 607200 performing MIMO encoding in PLP data, and a third BICM encoding block 607300 performing MIMO encoding in signaling information.

As the BICM encoding blocks in FIG. 17 operate the same as the BICM encoding blocks in FIG. 16, further description of them is omitted. However, the BICM encoding blocks of the MISO encoder 607120, 607420, 607520 and the MIMO encoder 607220 are positioned at the end of the time interleaver 607110, 607210-1-2, 607410 and 607510 which is distinguishable from the BICM encoding blocks according to the first embodiment.

Although not illustrated in FIG. 17, the BICM encoder according to the third embodiment of the present invention may include a first BICM encoding block for processing of MISO PLP data to be MISO encoded, a second BICM encoding block for processing of MIMO PLP data to be MIMO encoded, and a third BICM encoding block for processing of signaling information to be MISO encoded. The BICM encoding blocks according to the third embodiment operate in the same way as the BICM encoding blocks according to the first embodiment illustrated in FIG. 16, and thus, a detailed description thereof is omitted. However, the BICM encoding blocks according to the third embodiment is different from the BICM encoding blocks according to the first embodiment in that the BICM encoding blocks according to the third embodiment do not include a MISO encoder and a MIMO encoder.

In addition, the BICM encoder according to the fourth embodiment of the present invention is almost the same as the BICM encoder according to the third embodiment, except that the BICM encoder performs MIMO encoding on MIMO PLP data to be processed using the MIMO scheme. That is, the BICM encoder according to the fourth embodiment of the present invention may include a first BICM encoding block for processing MISO PLP data to be MISO encoded, a second BICM encoding block for processing of MIMO PLP data to be MIMO encoded, and a third BICM encoding block for processing of signaling information to be MISO encoded. Here, the third BICM encoding block may include a first encoding block for processing of L1-pre signaling information and a second encoding block for processing of L1-post signaling information. In particular, the first BICM encoding block according to the fourth embodiment may not include a MISO encoder and the second 2 BICM encoding block may include a MIMO encoder. In this case, the MIMO encoder may be positioned behind a time interleaver as in the first embodiment, or may be positioned behind a constellation mapper according to the second embodiment as in the second embodiment. The position of the MIMO encoder may be changed according to a designer's intention.

Figure 18:
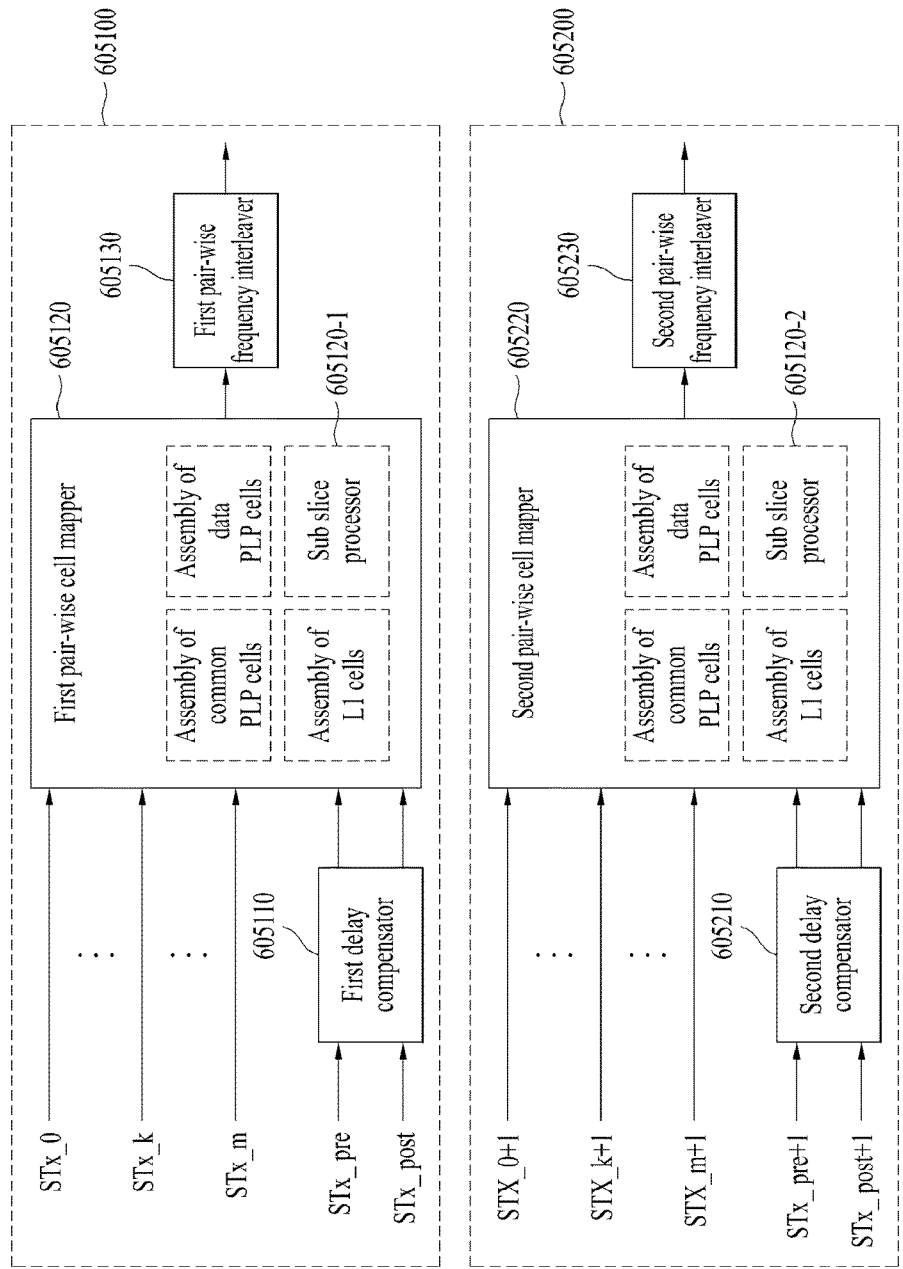
FIG. 18 shows a frame builder encoder according to an embodiment of the present invention.

FIG. 18 shows a frame builder according to an embodiment of the present invention.

The frame builder shown in FIG. 18 is an embodiment of the frame builder 101400 shown in FIG. 1.

The first BICM encoding block 604100 transmits MISO PLP data to two routes (STx_k, STx_K+1) and the second BICM encoding block 604200 transmits MIMO PLP data to two routes (STx_m, STx_m+1). Also, the third BICM encoding block 604300 transmits the L1-pre signaling information and the L1-post signaling information to two routes (STx_pre, Stx_pre_1 and STx_post, STx_post+1).

Each data is inputted into the frame builder. In that case, as shown in FIG. 18, the frame builder includes a first route receiving the BICM encoded data from STx_0 to STx_post, and a second route receiving the BICM encoded data from STx_0+1 to Stx_post+1. The data received in the first route is transmitted through a first antenna (Tx_1) and the data in the second route is transmitted through a second antenna (Tx_2).

As shown in FIG. 18, the frame builder according the first embodiment includes a first frame building block 605100 executing the data from the first route and a second frame building block 605200 executing the data from the second route. The first frame building block 605100 includes a first delay compensator 604110, a first pair-wise cell mapper 605120, and a first pair-wise frequency interleaver 605300-1, and a second frame building block 605200 includes a second delay compensator 605100-2 executing the data from the second route, a second pair-wise cell mapper 605200-2, and a second pair-wise frequency interleaver 605300-2.

The first pair-wise cell mapper 605120 and the first pair-wise frequency interleaver 605130, or the second pair-wise cell mapper 605120 and the second pair-wise frequency interleaver 605310 operate independently but the same functions in the first and the second routes respectively.

A method of performing data in the first frame building block 605100 and the second frame building block 605200.

The first delay compensator 605110 and the second delay compensator 605110 can compensate the L1-pre signaling data or the L1-post signaling data for the delay in the first frame and by the BICM encoder 604300. The L1-signaling information can include information not only in the current frame but also in the next frame. Thus, during the input processing, the L1-signaling information can be delayed one frame as opposed to PLP data inputted in the current frame. Through this process, one frame of the L1-signaling information having information about the current and the next frames.

The first pair-wise cell mapper 605120 and the second pair-wise cell mapper 605220 can perform mapping in the PLP data and the L1-signaling data in symbol units into cell units in a frame in the sub-carrier of the OFDM symbols.

In that case, the PLP data includes a common PLP DATA, a MISO/MIMO encoded PLP data and a sub-slice processor module 605120-1~2 performs frame-mapping in the PLP data in cell units for the diversity effect.

Also, the first pair-wise cell mapper 605120 and the second pairwise cell mapper 605220 can perform frame-mapping in two consecutive inputted cells in pairs.

For the better restoration performance of MISO signals, coherence between MSI transmitting channels should be secured when performing MISO encoding. Thus, in order to secure coherence, the first pair-wise cell mapper 605120 and the second pair-wise cell mapper 605220 pair up cells generated from the same PLP and perform OFDM modulating in the paired-up cells. Then coherence between the channels will be maximized. In other words, according to an embodiment of the present invention, as the MISO encoder is positioned in the front of the BICM encoder, the structure of the frames is in pairs considering such MISO encoding process.

As mentioned above, when performing bit-interleaving or time interleaving by the bit-interleaver 604120 and the time interleaver 604160 using two FEC blocks, two paired up cells can be generated from two different FEC blocks. As the receiver ensures diversity, higher reception can be obtained. The first pair-wise frequency interleaver 605130 and the second pair-wise frequency interleaver 605230 perform frequency interleaving in the data in cell units from each route and transmits the frequency-interleaved data to the OFDM generator through each route.

In that case, the first pair-wise frequency interleaver 605130 and the second pair-wise frequency interleaver 605230 pair up two consecutive cells in interleaving units and then perform frequency interleaving. This is to maximize coherence between channels.

The frame builder illustrated in FIG. 18 may be applied to the first and second embodiments of the present invention. According to the third and fourth embodiments of the present invention, the frame builder may include a first cell mapper and a second cell mapper instead of the first pair-wise cell mapper 605120 and the second pair-wise cell mapper 605220, and include a first frequency interleaver and a second frequency interleaver instead of the first pair-wise frequency interleaver 605130 and the second pair-wise frequency interleaver 605230.

According to the third embodiment, after frequency interleaving, that is, after MISO/MIMO encoding in the OFDM generating process, MIMO/MISO encoding can be done in OFDM symbol units. If the MISO PLP data cells and MIMO PLP data cells are mapped in the same OFDM symbol, the OFDM generator cannot perform MISO/MIMO encoding independently. Thus, the first cell mapper and the second cell mapper dose not map the MISO/MIMO PLP data in the same OFDM symbol.

Also, in order to simplify the transmitting system, the first and second cell mappers according to the third embodiment operate the same.

But, although the MISO PLP data, L1-pre and post signaling data is transmitted from the first route only, the MIMO PLP data can be from the first and the second routes. Therefore, depending on the data inputted, the performance of the cell mapper is different.

More detailed description is as follows.

First, the first cell mapper and the second cell mapper receive the same MISO PLP data from the first route and the same L1-pre and post signaling data from the delay compensator. In that case, the first cell mapper and the second cell mapper perform mapping in the inputted data to be allocated into a sub-carrier of the OFDM symbol.

Second, among the first cell mapper and the second cell mapper, the first cell mapper only receives the MISO PLP data and the delayed compensated L1-pre and post signaling data. In that case, the second cell mapper performs mapping only for the MIMO PLP.

The first frequency interleaver and the second frequency interleaver perform frequency interleaving in the inputted data by cell units and transmits the data to the OFDM generator.

In that case, the first frequency interleaver and the second frequency interleaver perform frequency interleaving in the OFDM symbol into interleaving units. Also, if the second cell mapper 619210 receives MIMO PLP data only, the second frequency interleaver also performs interleaving in MIMO PLP data only.

Figure 19:
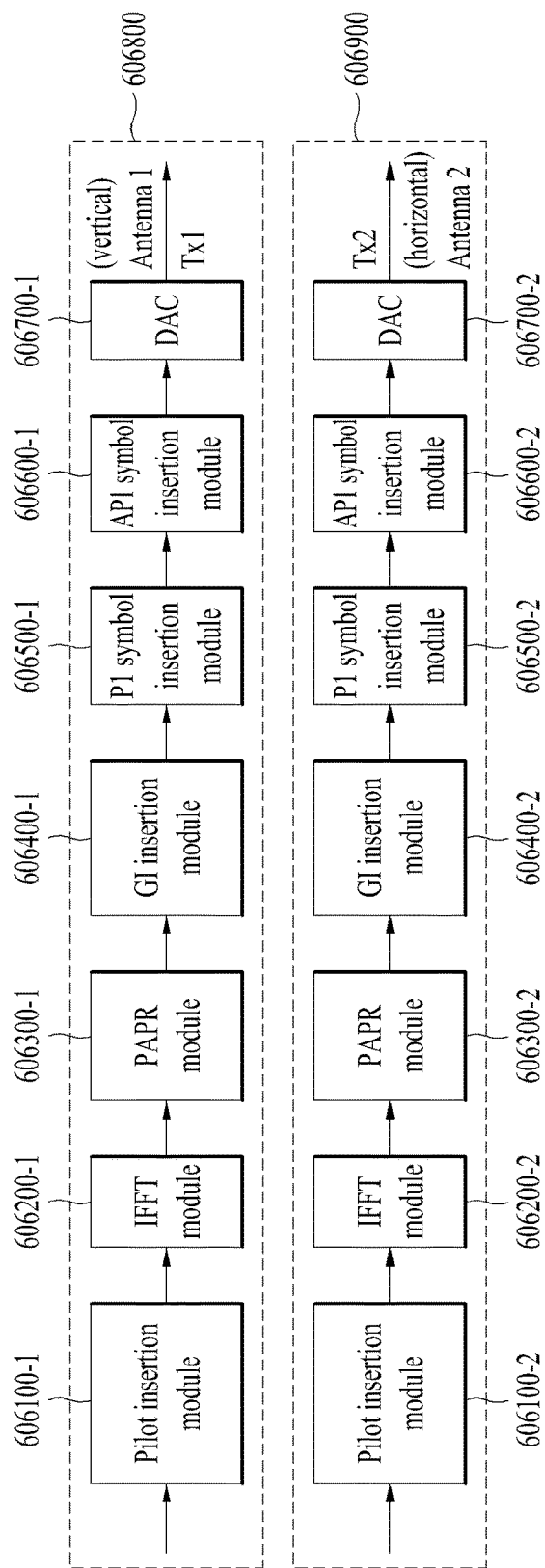
FIG. 19 shows an OFDM generator according to an embodiment of the present invention.

FIG. 19 shows an OFDM generator according to an embodiment of the present invention.

The OFDM generator in FIG. 19 is an embodiment of the OFDM generator 101500 shown in FIG. 1.

The present invention transmits broadcast signals by the MISO/MIMO method through two antennas. The OFDM generator in FIG. 19 receives and demodulates the broadcast signals through a first and a second route. It then transmits the signals to two antennas (Tx1, Tx2).

A first OFDM generating block 606800 modulates the broadcast signals through the first antenna (Tx1) and a second OFDM generating block 606900 modulates the broadcast signals through the second antenna (TX2).

If channel correlation between the first and second antennas is large, transmitted signals can apply polarity depending on the channel correlation. In the present invention, such a method is called polarity multiplexing MIMO. The first antenna is called "vertical antenna" and the second antenna is called "horizontal antenna". The first OFDM generating block 606800 performs OFDM modulating in broadcast signals through the first antenna (Tx1) and the second transmitter 606900 performs OFDM modulating in the broadcast signals from the first route and transmits the signals to the second antenna (Tx2).

Modules including the first OFDM generating block 606800 and the second OFDM generating block 606900 are as follows.

The first OFDM generating block 606800 includes a pilot insertion module 606100-1, an IFFT module 606200-1, a PAPR module 606300-1, a GI insertion module 606400-1, a P1 symbol insertion module 606500-1, an AP1 symbol insertion module 606600-1 and a DAC 606700-1, wherein modules in the first transmitting unit 606800 operate the same functions.

The second OFDM generating block 606900 includes a pilot insertion module 606100-2, an IFFT module 606200-2, a PAPR module 606300-2, a GI insertion module 606400-2, a P1 symbol insertion module 606500-2, an AP1 symbol insertion module 606600-2 and a DAC 606700-2, wherein modules in the first transmitting unit 606800 operate the same functions.

Thus, modules in the first OFDM generating block 606800 will be illustrated in more detail. The pilot insertion module inserts a pilot of the predetermined pilot pattern into a frame and transmits it to the IFFT module 606200-1. The pilot pattern information is transmitted with API signaling information or L1-signaling information.

The IFFT module 606200-1 performs IFFT algorithm in the signals and transmits them to the PAPR module 606300-1.

The PAPR module 606300-1 reduces PAPR of the signals in a time domain and transmits them to the GI insertion module 606400-1. Also, feedback on necessary information based on the PAPR reduction algorithm is given to the pilot insertion module 606100-1.

The GI insertion module 606400-1 copies the end of the effective OFDM symbol, inserts guard intervals in cyclic prefix to each OFDM symbol, and transmits them to the P1 symbol insertion module 606500-1. The GI information can be transmitted through the P1 signaling information or L1-pre signaling information.

The P1 and AP1 symbol are inserted in every frame of the P1 insertion module in the OFDM generator. That is, the P1 insertion module can insert more than two preamble symbols in every frame. When using more than two preamble symbols, burst fading that can happen in the mobile fading conditions will be more strengthened and signal detection performance will be improved.

The P1 symbol insertion module 606500-1 inserts a P1 symbol in the beginning of each frame and transmits it to the AP1 symbol insertion module 606600-1.

The AP1 symbol insertion module 606600-1 inserts an AP1 symbol at the end of the P1 symbol and transmits it to the DAC 606700-1.

The DAC 606700-1 converts the signal frame having the P1 symbol to an analog signal and transmits it to the transmitting antenna (Tx1).

The OFDM generator shown in FIG. 19 may be applied to the first and second embodiments of the present invention.

Although not shown in FIG. 19, according to the third embodiment of the present invention, the OFDM generator may include a MISO/MIMO encoder, a first OFDM generating block, and a second OFDM generating block. The first OFDM generating block and the second generating block according to the third embodiment of the present invention may perform the same operations as those of the first OFDM generating block 606800 and the second OFDM generating block 606900.

If the input data is MISO PLP data or L1-pre and post signaling data from the first and second routes, the MIMO/MISO encoder 603100 performs MISO encoding in the data into OFDM symbol units by using MISO encoding matrix and transmits it to the first and second generating blocks 620200, 620300. In that case, the input data is transmitted from either of the first or second route. According to an embodiment, the MISO encoding matrix can include an OSTBC (Orthogonal Space-Time Block Code)/OSFBC(Orthogonal Space Frequency Block Code/Alamouti code).

If data from the first and second routes is MIMO PLP data, the MIMO/MISO encoder performs MIMO encoding in the data into OFDM symbol units by using MIMO encoding matrix and transmits it to the first and second OFDM generating blocks. The MIMO encoding matrix of the present invention includes a spatial multiplexing, a Golden code (GC), a full-rate full diversity code, and a linear dispersion code. Also, the MIMO encoder performs MIMO encoding by using MIMO encoding matrix.

In addition, the OFDM generator according to the fourth embodiment of the present invention may include a MISO encoder, a first OFDM generating block, and a second OFDM generating block. The first OFDM generating block and the second generating block according to the fourth embodiment of the present invention may perform the same operations as those of the first OFDM generating block 606800 and the second OFDM generating block 606900.

The MISO encoder performs MISO encoding in the frequency-interleaved MISO PLP data, L1-pre signaling data and L1-post signaling data. The MISO encoder operates the same as the MIMO/MISO encoder according to the third embodiment. In addition, if the MIMO encoded MIMO PLP data is inputted, it may be bypassed and the MISO encoder may perform MISO encoding in the MIMO encoded MIMO PLP data.

Figure 20:
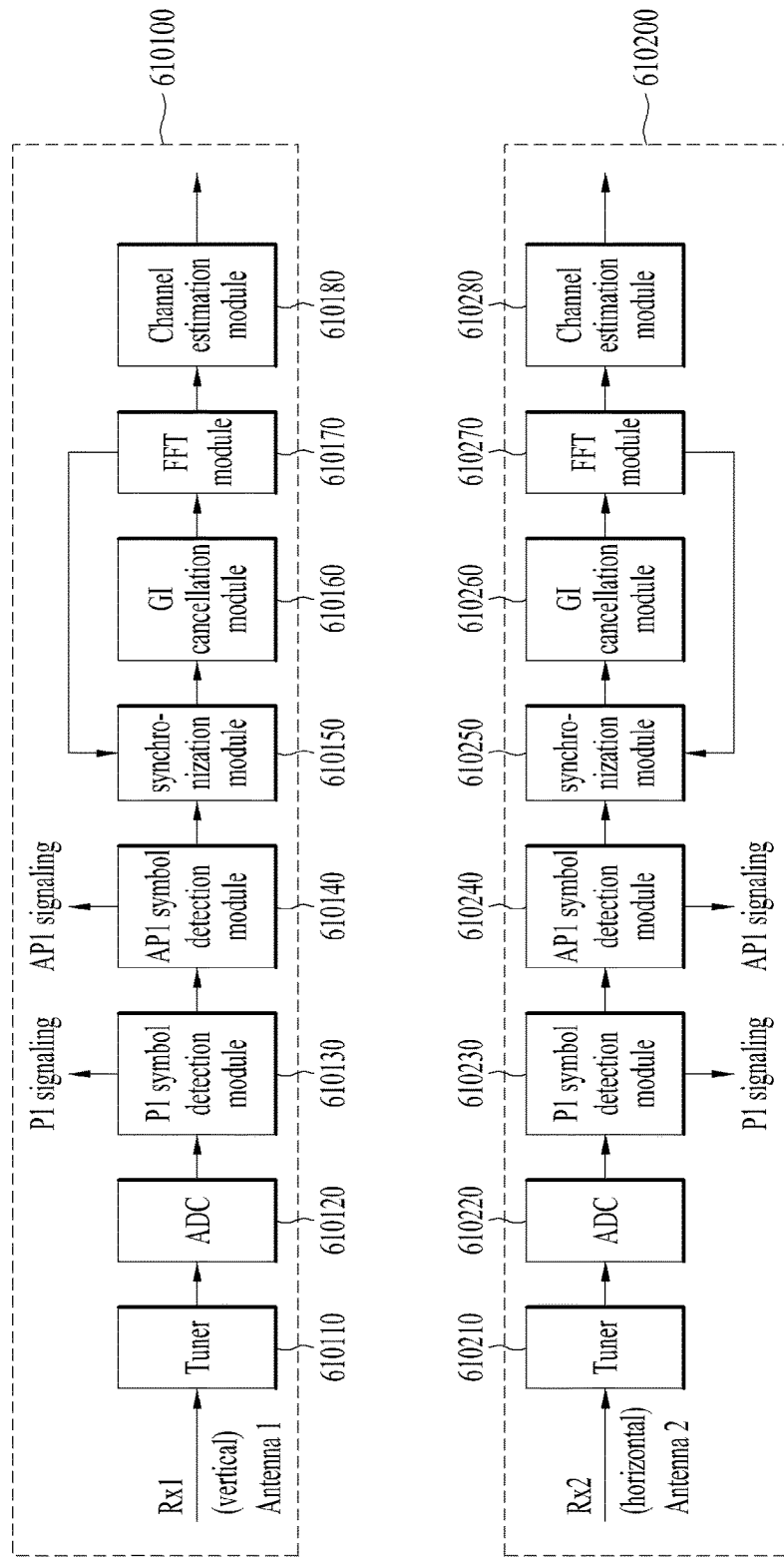
FIG. 20 shows an OFDM demodulator according to an embodiment of the present invention.
Figure 24:
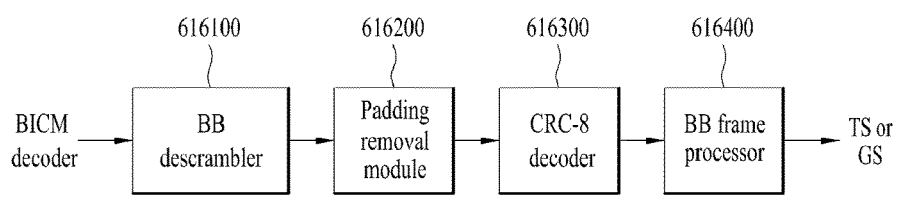
FIG. 24 shows an output processor according to an embodiment of the present invention.

FIG. 20 and FIG. 24 show a structure block of the broadcast signal receiver according to an embodiment of the present invention.

FIG. 20 shows an OFDM demodulator according to an embodiment of the present invention.

FIG. 20 shows a drawing of the OFDM demodulator according to an embodiment of the OFDM demodulator 107100 illustrated in FIG. 2.

According to an embodiment of the present invention, the present invention requires two antennas, Rx1 and Rx2, to receive transmitted signals by MIMO/MISO. The OFDM demodulator shown in FIG. 20 can perform OFDM demodulation through the Rx1 and Rx2 antennas.

A block demodulating transmitted signals through a first antenna (Rx1) is called a first OFDM demodulating block 610100 and a block demodulating transmitted signals through a second antenna (Rx2) is called a second OFDM demodulating block 610200.

In addition, the present invention can utilize polarity multiplexing MIMO according to an embodiment of the present invention. The first OFDM demodulating block 610100 performs OFDM demodulation in the broadcast signals transmitted through the first antenna (Rx1) and outputs the signals by a frame demapper to a first route, and the second demodulating block 610200 performs OFDM demodulating in the broadcast signals transmitted through the second antenna (Rx2) and outputs the signals by a frame demapper to a second route.

Also, the OFDM according to the first embodiment in FIG. 20 can perform the reverse process of the OFDM generator illustrated in FIG. 19.

The first OFDM demodulating block 610100 and the second OFDM demodulating block 610200 included in OFDM demodulator according to an embodiment of the present in invention including are as follows.

The first OFDM demodulating block 610100 includes a tuner 610110, an ADC 610120, a P1 symbol detection module 610130, an AP1 symbol detection module 610140, a synchronizing module 610150, a GI cancellation module 610160, a FFT module 610170 and a channel estimation module 610180.

The second OFDM demodulating block 610200 comprises a tuner 610210, an ADC 610220, a P1 symbol detection module 610230, an AP1 symbol detection module 610240, a synchronizing module 610250, a GI cancellation module 610260, a FFT module 610270 and a channel detection module 610280, and operates the same as the first OFDM demodulating block 610100.

Thus, modules in the first OFDM demodulating block 610100 will be further illustrated.

The tuner 610110 receives broadcast signals by selecting a frequency range and transmits it to the ADC 610120 by compensating the size of the signal.

The ADC 610120 coverts analog broadcast signals into digital signals and transmits them to the P1 symbol detection module 610130.

The P1 symbol detection module 610130 extracts P1 symbols in the P1 signaling information and decodes the P1 signaling information. Also, the P1 symbol detection module 610130 transmits the decoded P1 signaling information to the synchronizing module 610150 and a system controller (not shown in the drawing). The system controller determines which frame the received signal has by using the decoded P1 signaling information and controls other devices.

The AP1 symbol detection module 610140 extracts AP1 symbols in the AP1 signaling information and decodes the AP1 signaling information. Also, the AP1 symbol detection module 610140 transmits the decoded AP1 signaling information to the synchronizing module 610150 and a system controller (not shown in the drawing). The system controller determines the pilot pattern information in the current frame and L1-pre spread interval information by using the decoded AP1 signaling information.

The synchronizing module 610150 performs time and frequency synchronizing by using the decoded P1 signaling information and the AP1 signaling information.

The GI cancellation module 610160 deletes guard intervals included in the synchronized signals and transmits them to the FFT module 610170.

The FFT module 610170 converts the signals from the time domain to the frequency domain by performing FFT algorithm.

The channel detection module 610180 detects a transmitting channel from the transmitting antenna to the receiving antenna by using pilot signals having the converted signals. Then, the channel detection module 610180 can additionally perform equalizing for each of the received data. Signals that are converted into the frequency domain will be inputted in the frame demapper.

The OFDM demodulator illustrated in FIG. 20 may be applied to the first and second embodiments of the present invention.

Although not illustrated in FIG. 20, according to the third embodiment of the present invention, the OFDM demodulator may include a first OFDM demodulating block, a second OFDM demodulating block, and a MISO/MIMO decoder. The first OFDM demodulating block and the second OFDM demodulating block according to the third embodiment of the present invention may perform the same operations as those of the first OFDM demodulating block 610100 and the second OFDM demodulating block 610200. However, the OFDM demodulator according to the third embodiment may include a MIMO/MISO decoder 626300, a detailed operation of which will be described below.

The OFDM according to the fourth embodiment of the present invention may include a first OFDM demodulating block, a second OFDM demodulating block, and a MISO decoder. The first OFDM demodulating block and second OFDM demodulating block according to the fourth embodiment of the present invention may perform the same operations as those of the first OFDM demodulating block 610100 and the second OFDM demodulating block 610200.

Figure 21:
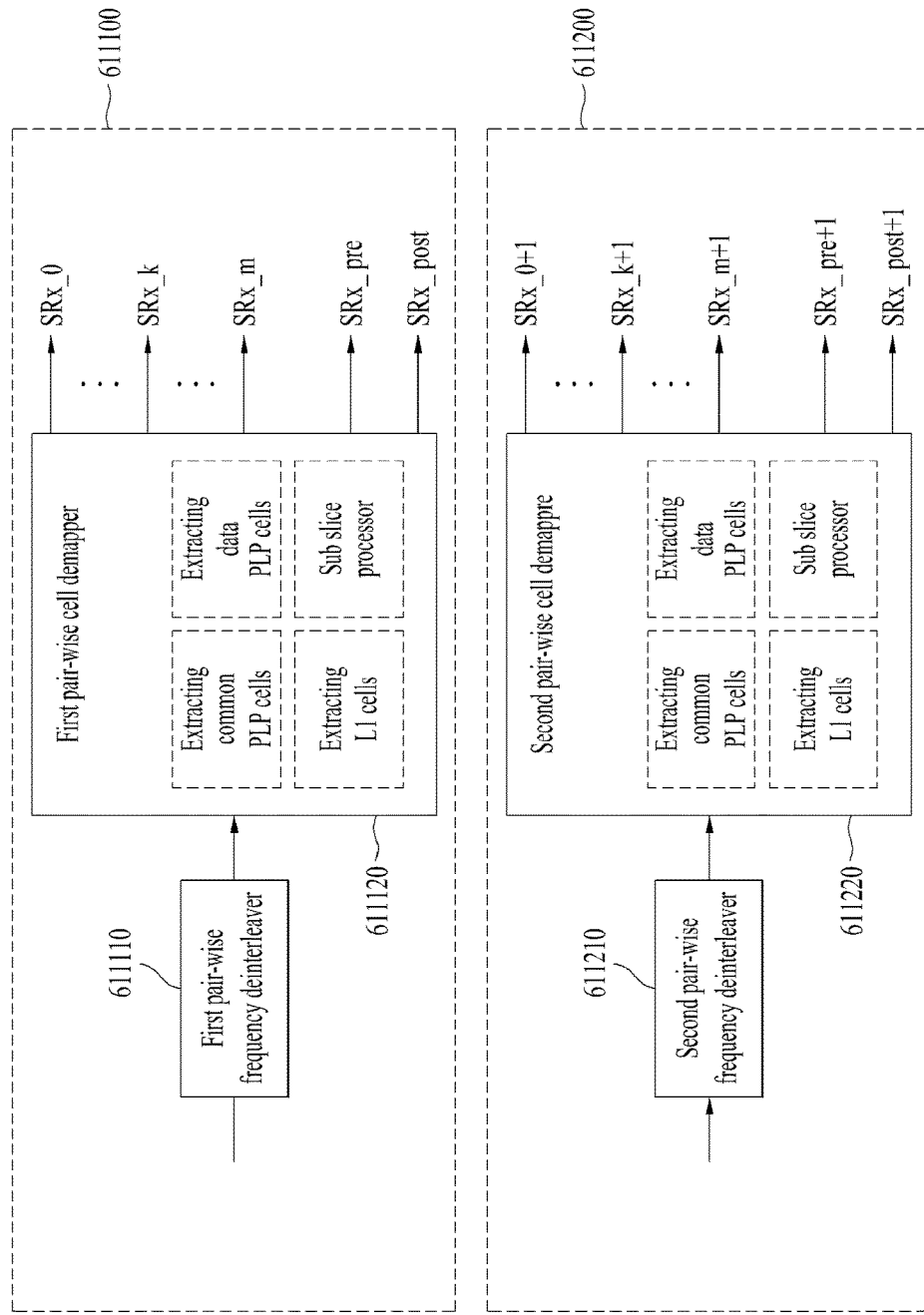
FIG. 21 shows a frame demapper according to an embodiment of the present invention.

FIG. 21 shows a frame demapper according to an embodiment of the present invention.

The frame demapper in FIG. 21 is an embodiment of the frame demapper 107200 in FIG. 2.

The frame demapper illustrated in FIG. 21 includes the first frame demapping block 611100 executing data from a first route and a second frame demapping block 611200 executing data from a second route. The first frame demapping block 611100 includes a first pair-wise frequency deinterleaver 611110 and a first pair-wise cell demapper 611120, and the second demapping block 611200 includes a second pair-wise frequency deinterleaver 611210 and a second pair-wise cell demapper 611220.

Also, the first pair-wise frequency deinterleaver 61110 and the first pair-wise cell demapper 611120 or the second pair-wise frequency deinterleaver 611210 and the second pair-wise cell demapper 611220 can operate independently and the same through a first route and a second route respectively.

Also, the frame demapper illustrated in FIG. 21 can perform the reverse process of the frame builder illustrated in FIG. 18.

A method of performing data by blocks included in the first frame builder demapping block 611100 and the second frame builder demapping block 611200 is as follows.

The first pair-wise frequency deinterleaver 611110 and the second pair-wise frequency deinterleaver 611210 perform deinterleaving in data in the frequency domain through the first and second routes into cell units in that case, the first pair-wise frequency deinterleaver 611110 and the second frequency deinterleaver 611210 pair up two consecutive cells in deinterleaving units and perform frequency deinterleaving. The deinterleaving process can be performed in a reverse direction of the interleaving process in the transmitting unit. The frequency-deinterleaved data will be transmitted in the original order.

The first pair-wise cell demapper 611120 and the second pair-wise cell demapper 611220 can extract common PLP data, PLP data and L1-signaling information in cell units from the de-interleaved data. The extracted PLP data includes MISO PLP data for the MISO method and MIMO PLP data for the MIMO method, and the extracted L1-signaling data includes information necessary for the current and next frames. Also, if the transmitter performs sub-slicing in the PLP data, the first and the second pair-wise cell demappers 611120, 611220 can merge the sliced PLP data and generate it in one stream.

Also, the first pair-wise cell demapper 611120 and the second pair-wise cell demapper 611220 can pair up two consecutive cells.

Data transmitted through the first route is inputted to the BICM decoder by the route from SRx_0 to SRx_post and data transmitted through the second route is inputted to the BICM decoder by the route from SRx_0+1 to SRx_post+1.

The frame demapper shown in FIG. 21 may be applied to the first and second embodiments of the present invention. In accordance with the third and fourth embodiments of the present invention, the frame demapper includes a first frame demapping block 627100 performing data from a first route and a second frame demapping block 627200 performing data from a second route.

The first frame demapping block includes a first frequency deinterleaver, a first cell demapper, a first combiner, a second combiner and a third combiner, and the second frame demapping block includes a second frequency deinterleaver and a second cell demapper.

Also, the first frequency deinterleaver and the first cell demapper or the second frequency deinterleaver and the second cell demapper can operate independently and the same through a first route and a second route respectively.

The first frequency deinterleaver and the second frequency deinterleaver perform deinterleaving in data in the frequency domain through the first and second routes into cell units.

The first and second cell demappers perform extracting common PLP data, PLP data and L1-signaling data from the deinterleaved data by cell units. The extracted PLP data includes the MISO decoded MISO PLP data and MIMO decoded MIMO PLP data, and the extracted L1-signaling data includes information necessary for the current and next frames. Also, if the transmitter performs sub-slicing in the PLP data, the first sub-slice processor 627120-1, 627220-1 of the first and the second cell demappers 627120, 627220 can merge the sliced PLP data and generate it in one stream.

The first combiner can combine the MISO decoded MISO PLP data if it does not combine the MISO PLP data in the MIMO/MISO decoder.

The second combiner and the third combiner can operate the same as the first combiner but it deals with L1-pre and L1-post signaling data.

Figure 22:
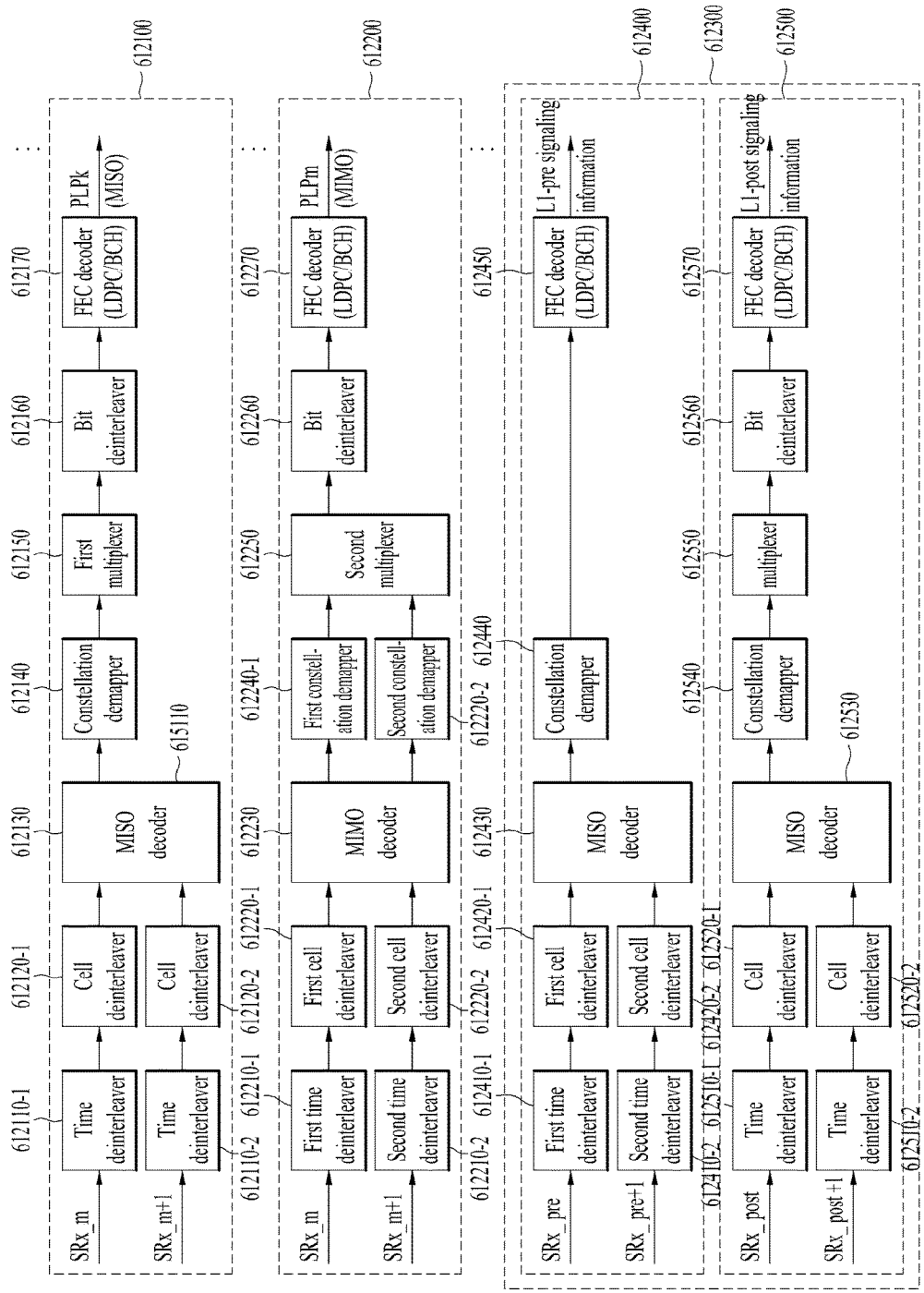
FIG. 22 shows a BICM decoder according to an embodiment of the present invention.

FIG. 22 shows a BICM encoder according to an embodiment of the present invention.

The BICM encoder in FIG. 22 according to the first embodiment of the present invention is an embodiment of the BICM encoder 107300 in FIG. 2.

The BICM decoder according to the first embodiment receives data from the first route via SRx_0 to SRx_post by a frame demapper and data from the second route via SRx_0+1 to SRx_post+1 and performs BICM decoding.

Also, the BICM decoder according to the first embodiment independently performs MISO/MIMO encoding in each of the data.

That is, the BICM decoder in FIG. 22 includes a first BICM decoding block 612100 performing MISO PLP data from SRx_k and SRx_k+1, a second BICM decoding block 612200 performing MIMO PLP data from SRx_m and SRx_m+1, and a third BICM decoding block 612300 performing MISO encoding in the L1-signaling information from SRx_pre, SRx_pre+1, SRx_post, and SRx_post+1.

Also, the BICM decoder according to the first embodiment of the present invention can perform the reverse process of the BICM encoder according to the first embodiment of the present invention illustrated in FIG. 16.

Data-performation method for each block is illustrated.

First, the first BICM decoding block 612100 includes a time deinterleaver 612110-1, 612110-2, a cell deinterleaver 612120-1, 612120-2, a MISO decoder 612130, a constellation demapper 612140, a first demultiplexer 612150, a bit deinterleaver 612160, and a FEC decoder 612170.

The time deinterleaver 612110-1, 612110-2 restores the MISO decoded data into a time domain and the cell deinterleaver 612120-1, 612120-2 performs deinterleaving in the time-deinterleaved data into cell units.

The MISO decoder 612130 can perform MISO decoding in MISO PLP data. The MISO decoder 612130 can perform four functions.

First, if the channel estimation modules 610180, 610280 included in the OFDM demodulator illustrated in FIG. 20 do not perform channel equalizing, the MISO decoder 612130 applies the effect of the channel detection regarding every transmissible reference point and computes an LLR value. Therefore, it will have the same effect.

Second, the MISO decoder 612130 performs the following functions based on the performance of the constellation mapper 604140. If the BICM encoder of the broadcast signal transmitter rotates the constellation mapper with a certain angle and delays the Q-phase element of the constellation for a certain value, the MISO decoder 612130 delays the 1-phase element of the constellation for a certain value and computes a 2D-LLR value based on the rotation angle.

If the constellation mapper 604140 does not rotate constellation and does not delay the Q-phase of constellation for a certain value, the MSIO decoder 612130 can compute the 2-D LLR value based on the normal QAM.

Third, the MISO decoder 612130 selects a decoding matrix to perform the reverse process based on the encoding matrix used by the MISO encoder 604150.

Fourth, the MISO decoder 612130 can combine signals inputted from two antennas. The signal combining method includes maximum ratio combining, equal gain combining, and selective combining and obtains the diversity effect by maximizing the SNR of the combined signals.

The MISO decoder 612130 performs MISO decoding in the combined signal and combine the MISO-decoded combined signals.

The constellation demapper 612140 can perform the following functions based on the performance of the MISO decoder 612130.

First, if the MISO decoder 612130 does not transmit the LLR value directly and only performs MISO decoding, the constellation demapper 612140 can compute the LLR value. In more detail, if the constellation demapper 604140 in the BICM encoder performs constellation rotation or Q-phase element delay, the constellation demapper 612140 delay the 1-phase LLR element and computes the LLR value. If the constellation demapper 604140 does not perform the constellation rotation and Q-phase element delay, the constellation demapper 612140 can compute the LLR value based on the normal QAM.

The computing the LLR value includes computing 2-D LLR and computing 1-D LLR. When computing the 1-D LLR, the complexity of the LLR computation can be reduced by executing either one of a first or a second route.

The first multiplexer 612150 restores demapped data in bit stream.

The bit-interleaver 612160 performs deinterleaving in the bit-stream, FEC decoding in the deinterleaved data, and outputs MISO PLP data by correcting errors in the transmitting channels.

The second BICM decoding block 612200 includes a first time deinterleaver 612210-0 and a second time deinterleaver 612210-1, a first cell deinterleaver 612220-0 and a second cell deinterleaver 612220-1, a MIMO decoder 612230, a first constellation demapper 612240-0 and a second constellation demapper 612240-1, a second multiplexer 612250, a bit interleaver 612260 and a FEC decoder 612270.

The first time deinterleaver 612210-0 and the second time deinterleaver 612210-1 perform deinterleaving in the MIMO decoded data into cell units. In that case, the first cell deinterleaver 612220-0 and the second deinterleaver 612220-1 performs cell deinterleaving in only a half of the cell data in one FEC block. As a result, cell deinterleaving by the first and second cell deinterleaver 612220-0, 612220-1 has the same effect as deinterleaving by a cell deinterleaver using one FEC block.

The MIMO decoder 612230 performs in MIMO PLP data from SRx_m and SRx_m+1. The MIMO decoder 612210 can perform the four functions of the MISO decoder 612110 except for the fourth function in which the signals are to be combined. Then, the MIMO decoder 612230 performs decoding by using MIMO encoding matrix of the first and sixth embodiment.

The first constellation demapper 612240-0, the second constellation demapper 612240-1, the second multiplexer 612250, bitinterleaver 612260 and FEC decoder 612270 operates the same as those according to the first BICM decoding block 612100.

The third BICM decoding block 612300 includes a first decoding block 612400 performing L1-pre signaling data and a second decoding block 612500 performing L1-post signaling data. The first decoding block 612400 includes a time deinterleaver 612410-1, 612410-2, a cell deinterleaver 612420-1, 612420-2, a MISO decoder 612430, a constellation demapper 612440, and a FEC decoder 612450, and the second decoding block 612500 includes a time deinterleaver 612510-1, 612510-2, a cell deinterleaver 612520-1, 612520-2, a MISO decoder 612530, a constellation demapper 612540, a multiplexer 612550, a bit deinterleaver 612560, and a FEC decoder 612570.

As the first decoding block 612400 and the second decoding block 612500 have the same functions, the description of the first BICM decoding block 612100 is omitted.

As a result, the first BICM decoding block 612100 outputs the BICM decoded MISO PLP data to an output processor and the second BICM decoding block 612200 transmits the BICM decoded MIMO PLP data to the output processor.

The first decoding block 612400 in the third BICM decoding block 612300 performs MSIO decoding in L1-pre signaling data and transmits the data. Also, the second decoding block 612500 in the third BCIM decoding block 612300 performs MISO decoding in L1-post signaling data and transmits one L1-post signaling information.

Figure 23:
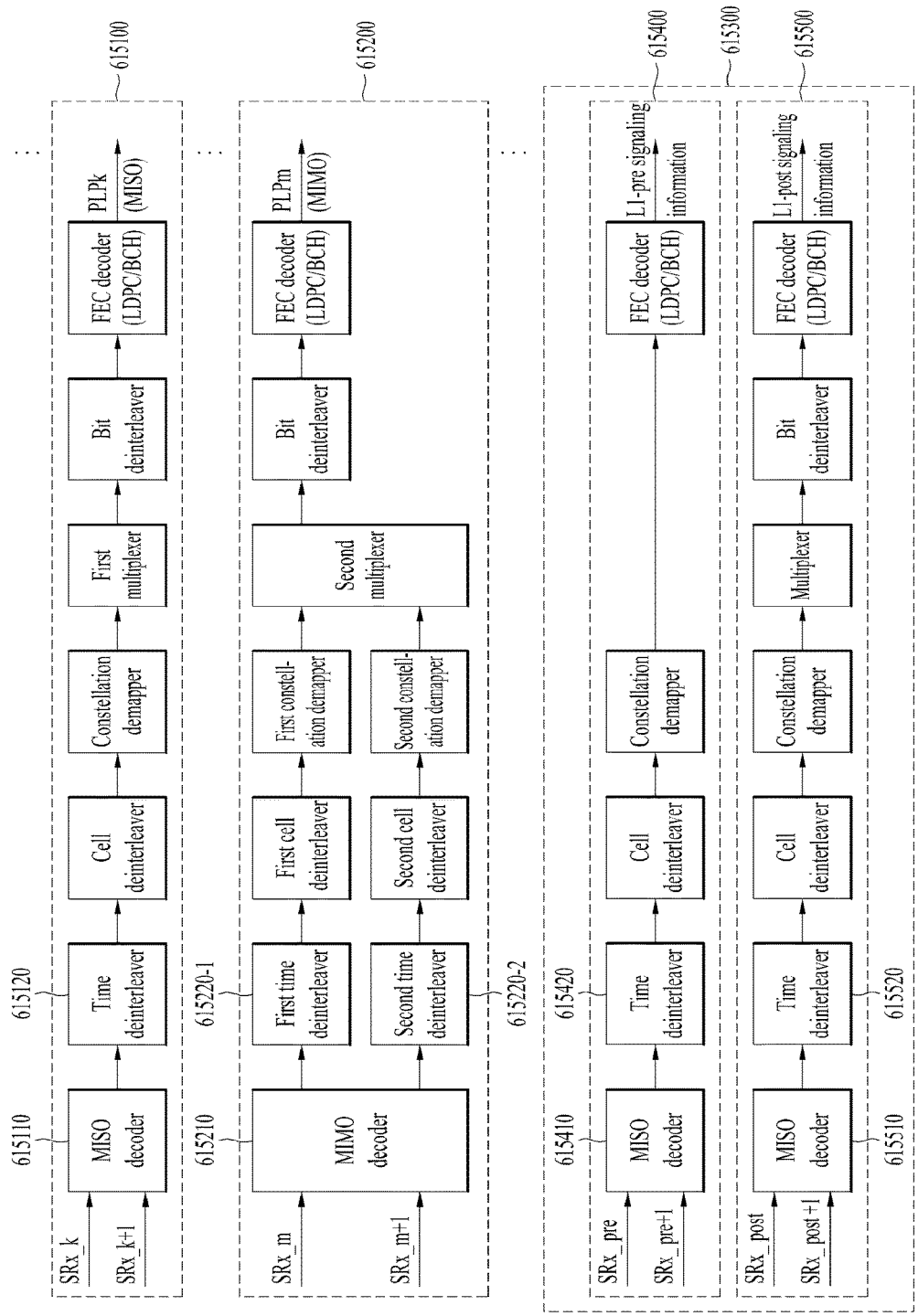
FIG. 23 shows a BICM decoder according to another embodiment of the present invention.

FIG. 23 shows a BICM decoder according to another embodiment of the present invention.

The BICM decoder in FIG. 23 according to the second embodiment of the present invention is an embodiment of the BICM decoder 107300 in FIG. 2.

The BICM decoder according to the second embodiment receives data transmitted from a first route to a route of from SRx_0 to SRx_post and data transmitted from a second route to a route of from SRx_0+1 to SRx_post+1, and performs BICM decoding. Also, the BICM decoder according to the second embodiment can independently apply the MISO/MIMO process.

That is, the BICM decoder in FIG. 23 includes a first BICM decoding block 615100 performing MISO encoding in MSIO PLP data from SRx_k and SRx_k+1, a second BICM decoding block 615200 performing in MIMO PLP data from SRx_post and SRx_post+1, and a third BICM decoding block 615300 performing MISO encoding in L1-signaling data from SRx_pre, SRx_pre+1, SRx_post, and SRx_m+1.

Also, the third BICM decoding block 615300 includes a first decoding block 615400 performing the L1-pre signaling data and a second decoding block 615500 performing L1-post signaling data.

Also, the BICM decoder according to the second embodiment can perform the reverse process of the BICM encoder according to the second embodiment illustrated in FIG. 17.

The decoding blocks according to the second embodiment in FIG. 23 operate the same as the decoding blocks according to the first embodiment in FIG. 22. Therefore, further description is omitted. However, the only difference is that in the BICM decoder the MISO decoder 615110, 615410, 615510 and the MIMO decoder 615310 are located in front of the time deinterleaver deinterleaver 615120, 615220-1, 615220-2, 615420, 615520.

As above described, the PLP data and the signaling information are performed into symbol units after the constellation mapping. In addition, the broadcast signal receiver may perform BICM decoding on data received in reverse processes to those of the BICM encoding blocks according to the first embodiment or the second embodiment. In this case, a MISO decoder, a MIMO decoder, a time deinterleaver, and a cell deinterleaver of the broadcast signal receiver may perform the received data in symbol units. However, the BICM decoder of the broadcast signal receiver may first perform MISO decoding or MIMO decoding for each data, and thus, each data is output in bit units. Then, the BICM decoder of the broadcast signal receiver may perform time deinterleaving and cell deinterleaving processes, but requires information regarding a symbol unit of data output in bit units. Thus, the broadcast signal receiver may store information regarding symbol mapping of input bits required for the deinterleaving processes.

As not shown in drawings, the BICM decoder according to the third embodiment includes a first BICM decoding block processing the MISO decoded MISO PLP data transmitted through one path, a second BICM decoding block processing the MIMO decoded MIMO PLP data transmitted through two paths, and a third BICM decoding block processing the MISO encoded L1-signaling data transmitted through two paths. Also, the third BICM decoding block includes a first decoding block processing L1-pre signaling data and a second decoding block processing L1-post signaling data.

Also, as the BICM decoder according to the third embodiment operates the same as the BICM encoding blocks according to the first embodiment in FIG. 22. However, the only difference is that the BICM decoding blocks according to the third embodiment do not include MISO/MIMO decoders.

Also, the BICM decoder according to the fourth embodiment of the present invention includes a first BICM decoding block processing MISO PLP data transmitted through one path, a second BICM decoding block processing MIMO PLP data transmitted through two paths, and a third BICM decoding block processing MISO decoded L1-signaling data transmitted through two paths.

Also, the third BICM decoding block includes a first decoding block processing L1-signaling data and a second decoding block processing L1-post signaling data.

As the first BICM decoding block according to the fourth embodiment operates the same as the BICM decoding blocks illustrated in FIG. 22.

But, the only difference is that the second BICM decoding block includes the MIMO decoder as opposed to the third embodiment of the present invention. In that case, the transmitting character of MIMO PLP data from a first and a second route may or may not be the same. Also, if the modulation orders of the two MIMO PLP data are the same, a second constellation mapper, a second cell interleaver and a second time interleaver may not be used. Thus, two of the MIMO PLP data will be merged into one input in the first time deinterleaver, the first cell deinterleaver, the first constellation demapper, and then will be inputted to the second multiplexer. In addition, the MIMO decoder may be positioned in front of the time deinterleavers as in the first embodiment or may be positioned in front of the constellation demappers as in the second embodiment.

Figure 25:
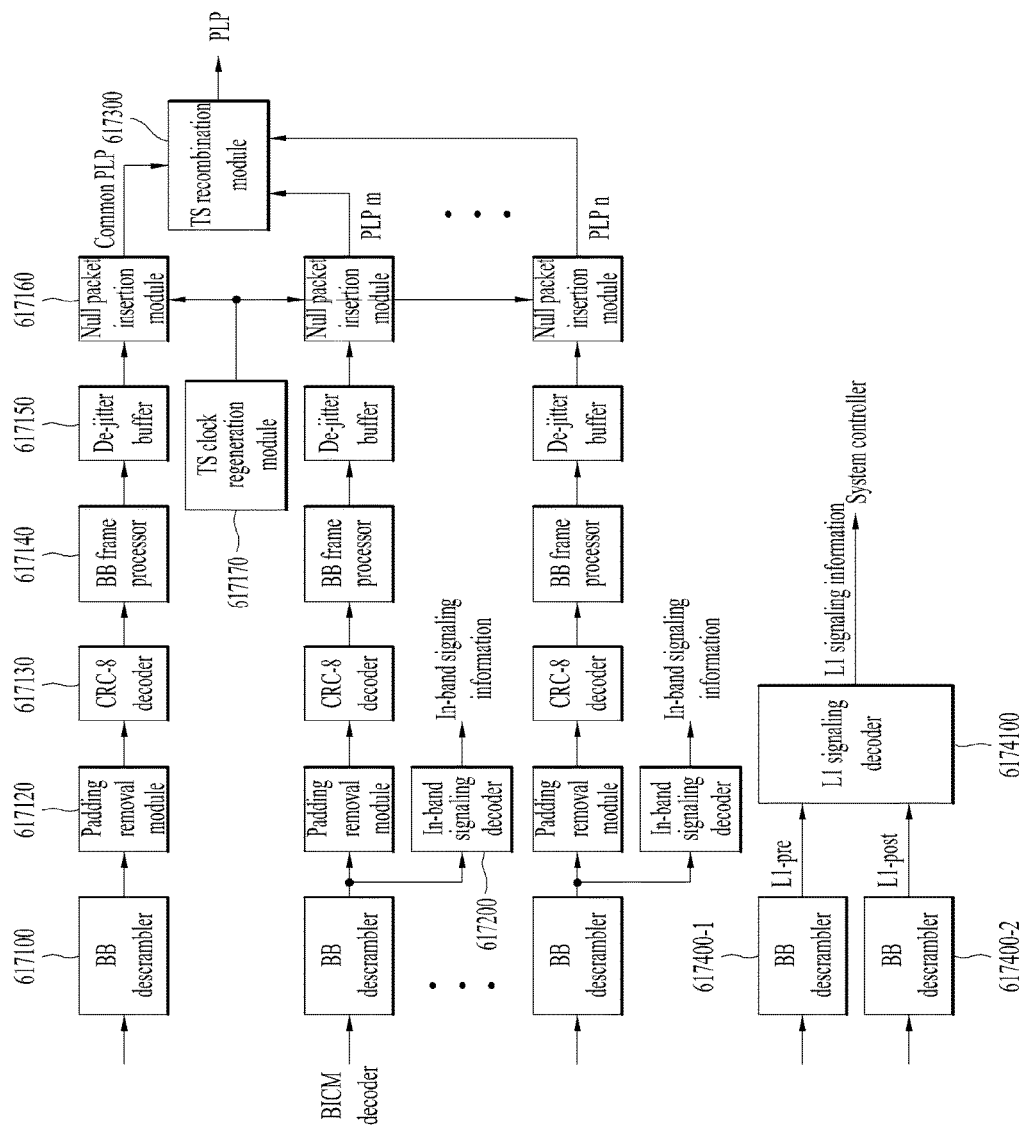
FIG. 25 shows an output processor according to another embodiment of the present invention.

FIG. 24 and FIG. 25 show an embodiment of an output processor included broadcast signal receiver according to an embodiment of the present invention. The following is a specific description of the output processor.

FIG. 24 shows an output processor of the broadcast signal receiver according to an embodiment.

The output processor in FIG. 24 is an embodiment of the output processor 107400 in FIG. 2.

The output processor in FIG. 24 as opposed to an input processor performing single PLP in FIG. 13 performs the reverse process of it and includes a BB discrambler 616100, a padding remove module 616200, a CRC-8 decoder 616300 and a BB frame processor 616400. The output processor performs the reverse process of the input processor illustrated in FIG. 13 by receiving bit stream from the BICM decoder.

The BB descrambler 616100 receives bit stream, performs XOR algorithm with the same bit-string as PRBS processed by the BB scrambler and outputs it. The padding remove module 616200 removes, if necessary, padding bits inserted in the padding insertion module. The CRC-8 decoder 616300 performs CRC decoding in the bit-stream and the BB frame processor 616400 decodes information in the BB frame header and restores TS or GS by using the decoded information.

FIG. 25 shows another embodiment of an output processor of the present invention.

The output processor in FIG. 25 as opposed to the input processor in FIG. 14 and FIG. 15 performing a plurality of PLP performs the reverse process of it. The output processor includes a plurality of blocks for a plurality of PLP. The blocks are as follows. The output processor includes a BB descrambler 617100, 617400-1, 617400-2 and a padding removal module 617120, a CRC-8 decoder 617130, a BB frame processor 617140, a De jitter buffer 617150, a null packet insertion module 617160, a TS clock regeneration module 617170, an in-band signaling decoder 617180, a TS recombination module 617300 and a L1 signaling decoder 617410. The same blocks as in FIG. 24 are omitted.

Processing for a plurality of PLP can be shown as decoding PLP data regarding common PLP or decoding service components like scalable video service or a plurality of services at once. The BB descrambler 617110, the padding removal module 617120, the CRC-8 decoder 617130 and the BB frame processor 617140 operate the same as those in FIG. 40.

The De jitter buffer 617150 compensates a temporarily inserted delay for the synchronization of a plurality of PLP based on Time To Output (TTO) parameters. The null packet insertion module 617160 restores the deleted null packet based on the Deleted Null Packet (DNP) information. The TS clock regeneration module restores the detailed time synchronization of the outputted packet based on Input Stream Time Reference information. The TS recombination module 617300 receives the restored common PLP and related PLP data and transmit the original TS, IP or GS. The TTO parameters, DNP information, and ICSR information are obtained by the BB frame processor and it can transmit the data to each block or a system controller.

The in-band signaling decoder 617200 restores in-band signaling information via the padding bit filed of PLP data and transmits it.

As for L1 signaling information, the BB descramblers 617400-1, 617400-2 performs descrambling in the corresponding L1 pre signaling information data and L1-post signaling information, and the L1 signaling decoder 6174100 decodes the descrambled data and restores the L1 signaling information. The restored L1-signaling information includes 1-pre signaling information and L1-post signaling information. It will also be transmitted to the system controller and provides parameters for BICM decoding, frame demapping, and OFDM demodulating. The L1 signaling information can be inputted as one BB descrambler and will be descrambled.

Figure 26:
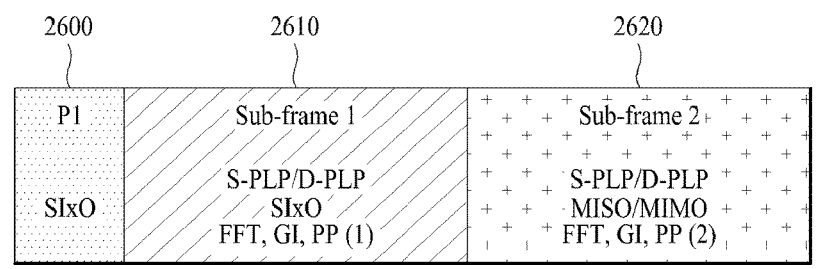
FIG. 26 shows a frame structure according to an embodiment of the present invention.

FIG. 26 shows a frame structure according to one embodiment of the present invention.

As described above, the frame builder 101400 of FIG. 1 may generate a frame upon receiving output data from the BICM encoder 101300. In this case, the output signaling information or PLP data may be processed by at least one of SISO, SIMO, MISO, and MIMO. However, SIxO-processed data and MIxO-processed data may have different pilot densities such that it is impossible for the SIxO-processed data and the MIxO-processed data to be simultaneously contained in the same frame. Therefore, according to one embodiment of the present invention, a symbol P1 and two subframes are contained in a single frame. In this case, two subframes may transmit SIxO-processed data and MIxO-processed data, respectively. One frame may also include the symbol P1 and only one subframe. In this case, SIxO-processed data and MIxO-processed data may be transmitted on a frame basis. The above-mentioned data transmission may be changed according to a designer's intention.

FIG. 26 shows an exemplary case in which P1 symbol 2600, a first subframe 2610, and a second subframe 2620 are contained in a single frame. A detailed description of FIG. 26 is as follows.

P1 symbol 2600 may be located prior to the frame, and may transmit information regarding a structure of a subframe contained in the corresponding frame. That is, the receiver may recognize whether the corresponding frame includes only one subframe or two different subframes through information included in the P1 symbol. In addition, the P1 symbol may perform SISO or SIMO processing for implementing data reception through even one antenna.

The first subframe 2610 may transmit SISO or SIMO processed data to enhance robustness. Therefore, the first subframe 2610 may include a PLP for transmitting SISO- or SIMO-processed L1 signaling information and a data PLP for transmitting a service or service component. In this case, PLP for transmitting L1 signaling information may include not only information regarding a first subframe but also information regarding a second subframe.

The second subframe 2610 may transmit MISO- or MIMO-processed data so as to improve transmission efficiency through a multiplexing gain. Therefore, the second subframe 2620 may include a signaling PLP for transmitting PLP information and a data PLP for transmitting the service or the service component. In this case, Alamouti coding such as SFBC/STBC, or TxAS (transmitter antenna switching), etc. may be used as the MIMO processing method.

In order to increase the efficiency of data transmitted through the second subframe 2620, data can be processed with a high code rate and a high constellation order, and may also be processed with a MIMO scheme, a Spatial Multiplexing (SM) scheme, a Golden Code (GC) scheme, etc.

As described above, since data transmitted from the first subframe 2610 and data transmitted from the second subframe 2620 have different characteristics, an FFT size, a GI size, and a pilot pattern of each subframe may be decided in different ways. In more detail, the FFT size, the GI size, and the pilot pattern of the first subframe 2610 may be decided in response to mobility or indoor reception of the receiver; and the FFT size, the GI size, and the pilot pattern of the second subframe 2620 may be decided to obtain a high transfer rate.

If two subframes use different pilot patterns, channel equalization performance of the receiver may be deteriorated. Therefore, assuming that two subframes according to the present invention use different pilot patterns, an edge pilot may be inserted into an OFDM symbol located at the front end or the rear end of each subframe according to one embodiment.

Therefore, the receiver may obtain information regarding a subframe contained in the corresponding frame by decoding the P1 symbol 2600. A decoding process for each subframe is performed such that the service or the service component can be obtained from a necessary PLP.

Figure 27:
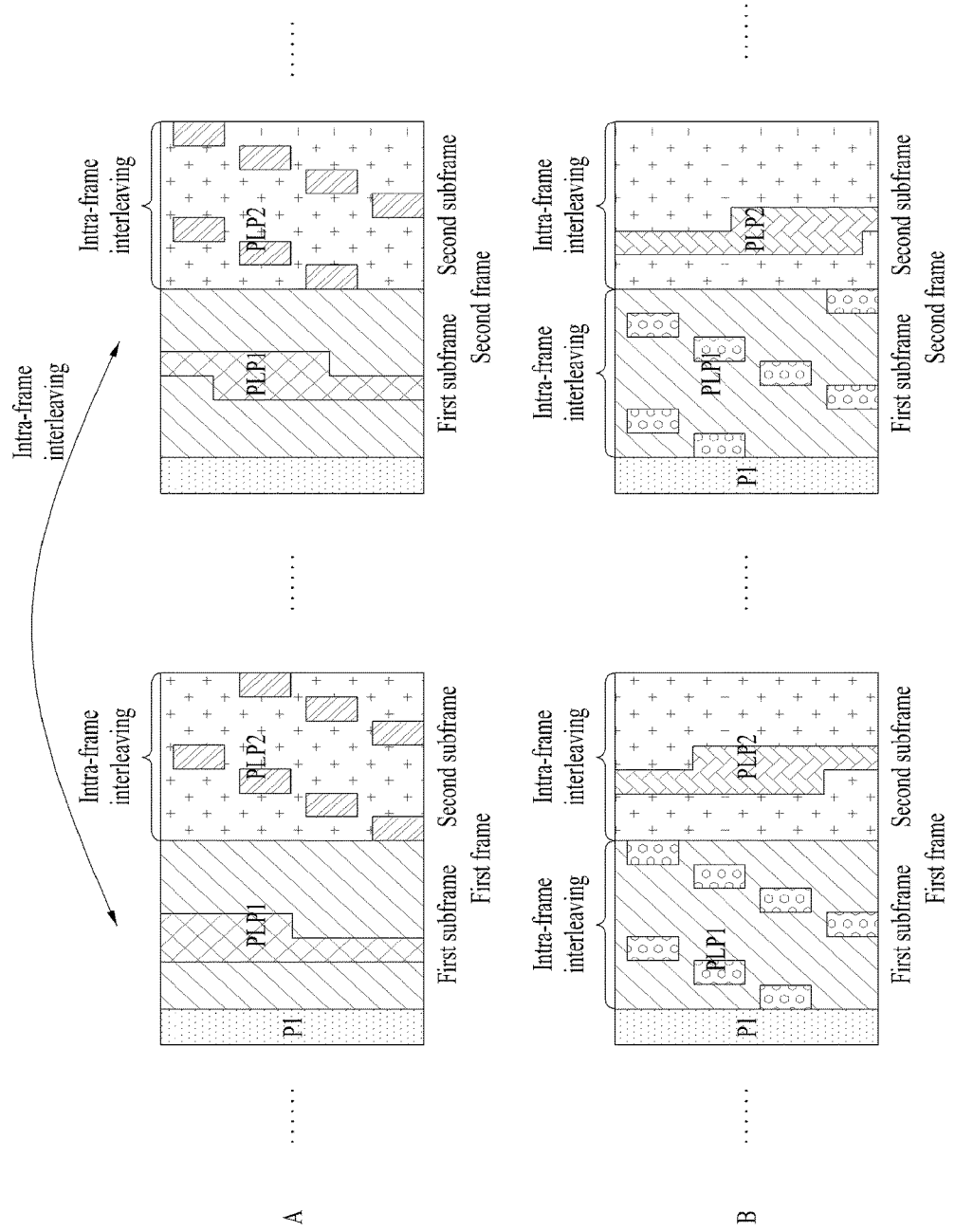
FIG. 27 shows another frame structure according to another embodiment of the present invention.

FIG. 27 shows a frame structure according to another embodiment of the present invention.

Referring to FIG. 27, the frame structure may be classified into Type 1 subframe and Type 2 subframe according to a sub-slice (or burst) configured to transmit a PLP. That is, assuming that the PLP contained in the subframe is transmitted through one sub-slice, the corresponding subframe may be referred to as Type 1 subframe. If the PLP contained in the subframe is transmitted through a plurality of sub-slices, the corresponding subframe may be referred to as Type 2 subframe.

In case of Type 1 subframe, since the service or the service component is transmitted by one subslice, the receiver can recover a desired service upon receiving the corresponding subslice. Therefore, the receiver can obtain the power saving effect. In addition, in case of Type 2 subframe, the corresponding service or the service component is transmitted through a plurality of subslices in a time domain of the corresponding subframe, the receiver may obtain a time-interleaving gain.

Even in the case of Type 1 subframe, if interleaving between subframes (i.e., inter-frame interleaving) is performed, it is possible to obtain a time interleaving gain whereas latency increases. In case of Type 2 subframe, if interleaving belonging to the corresponding subframe (i.e., intra-frame interleaving) is performed, it is possible to obtain a diversity gain and a short latency.

FIG. 27A shows an interleaved frame structure on the condition that the first subframe is any one of Type 1 subframe and the second subframe is Type 2 subframe.

Referring to FIG. 27A, inter-frame interleaving may be carried out in either PLP1 contained in a first subframe of the first frame and another PLP1 contained in a first subframe of the second frame, such that it is possible to obtain an interleaving gain of the PLP1. As shown in FIG. 27B, intra-frame interleaving may be carried out in either PLP2 contained in a second subframe of the first frame and another PLP2 contained in a second subframe of the second frame, such that it is possible to obtain an interleaving gain of the PLP2.

FIG. 27B shows an interleaved frame structure on the condition that the first subframe is any one of Type 2 subframe and the second subframe is Type 1 subframe.

Referring to FIG. 27B, the first and second subframes contained in the first and second subframes may perform intra-frame interleaving within each subframe according to one embodiment. In this case, the receiver may minimize power consumption of a PLP2 transmitted to the second subframe, resulting in reduction of latency. Specifically, data transmitted through the second subframe is MIMO-processed to have high efficiency, such that a time required for data transmission is gradually shorter than that of SISO or MISO. Therefore, a power-saving gain of the receiver may be more greatly increased.

As described above, data transmitted through a first subframe and a second subframe may have different physical characteristics. Therefore, in order to allow the receiver to decode data transmitted through each subframe, signaling information for each subframe is needed. L1 signaling information of FIG. 3 may include signaling information of each subframe according to one embodiment of the present invention.

In more detail, a configuration block contained in the above L1-pre signaling information or L1-post signaling information may include specific information indicating whether a local service is transmitted and associated physical information. Therefore, the receiver determines whether or not a local service is transmitted by decoding L1-pre signaling information or L1-post signaling information. If the local service is transmitted, the receiver may confirm physical characteristics of the local service.

As described above, assuming that one frame includes a first subframe and a second subframe, a configurable block or dynamic block contained in L1-pre signaling information and L1-post signaling information may include parameters for each subframe. In more detail, configurable parameters of each subframe may include a MIMO_TYPE field, an FFT_SIZE field, a GUARD_INERVAL field, a PILO_PATTERN field, a NUM_MIMO_SYMBOL field, etc. Detailed description thereof is as follows.

MIMO_TYPE field is a field indicating a MIMO scheme for processing data transmitted through a subframe. MIMO scheme may be SIxO, MISO, MIMO, etc.

FFT_SIZE field may indicate an FFT size used in the subframe.

GUARD_INERVAL field may indicate the size of a guard interval of a current subframe.

PILOT_PATTERN field is a field indicating a pilot insertion pattern of a current subframe.

NUM_MIMO_SYMBOL field is a field indicating the number of OFDM symbols of MIMO-processed data contained in the subframe. The number of OFDM symbols of SIxo- or MISO-processed data is obtained when the number of OFDM symbols of MIMO-processed data is subtracted from the number of OFDM symbols constructing the total frame.

Therefore, the receiver decodes a configurable block or a dynamic block contained in the L1-pre signaling information and L1-post signaling information so as to obtain parameters of each subframe, such that it can obtain a subframe structure belonging to one frame.

As shown in FIG. 4, one super-frame may include a plurality of frames. One superframe may include a T2 frame for transmitting data of a legacy broadcast system (or T2 broadcast system) and an NGH frame for transmitting data of the NGH broadcast system. Therefore, one superframe may include a plurality of T2 (or legacy frame) frames and NGH frames.

Figure 28:
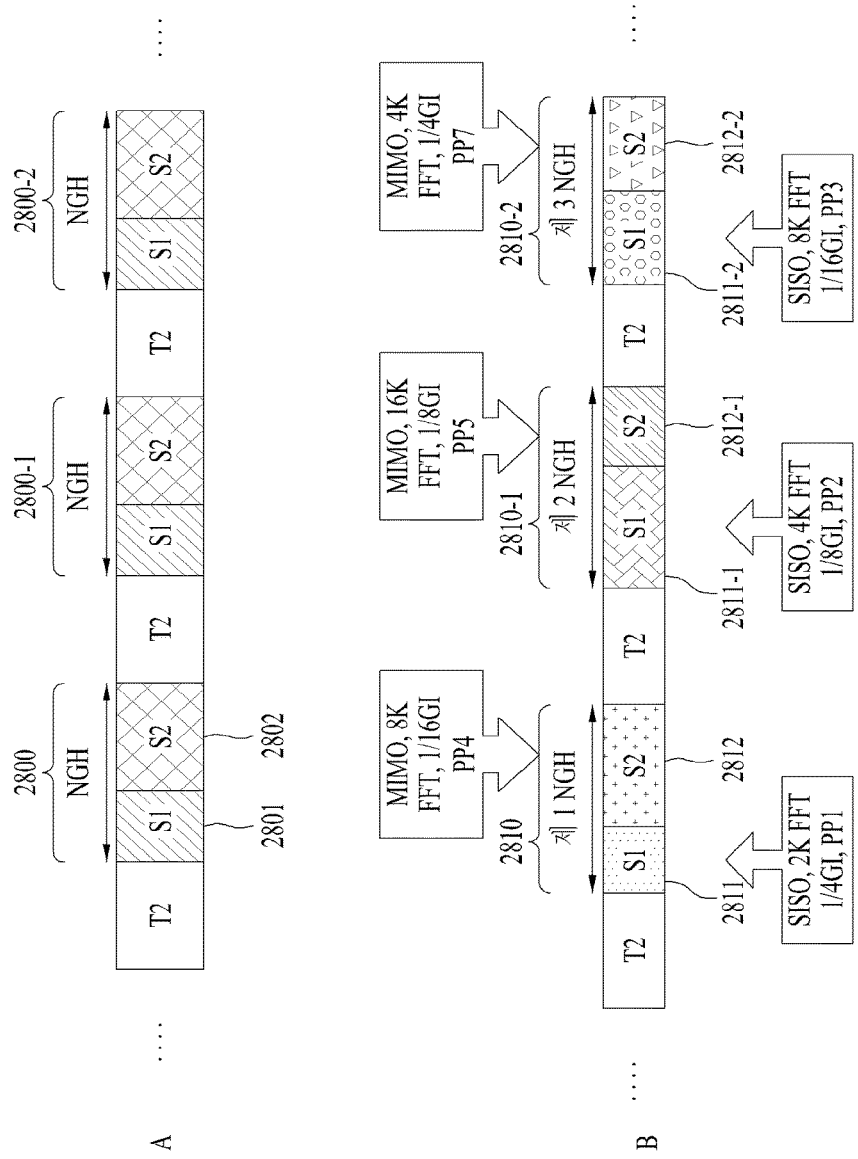
FIG. 28 shows a superframe structure according to an embodiment of the present invention.

FIG. 28 shows a superframe structure according to one embodiment of the present invention.

Referring to FIG. 28A, individual NGH frames contained in one superframe may include the same first and second subframes.

In this case, one NGH frame 2800 may include a first subframe 2801 and a second subframe 2802. The first subframe 2801 shown in FIG. 28A may include a plurality of parameters such as SISO, a size of 2K FFT, a guard interval of ¼ GI, a pilot pattern of PP1, etc. The second subframe 2802 may include a plurality of parameters such as MIMO, a size of 8K FFT, a guard interval of ⅛ GI, a pilot pattern of PP2, etc. In this case, parameters of each subframe may be transmitted through a configurable block of L1-pre signaling information or L1-post signaling information as described above. In addition, the first subframe and the second subframe contained in each NGH frame have the same physical parameters, and each subframe may have a predetermined length.

FIG. 28B shows one embodiment in which individual NGH frame contained in one superframe include different first and second subframes.

In this case, the first subframe and the second subframe contained in each NGH frame may have different physical parameters.

Referring to FIG. 28B, a first subframe 2811 contained in the first NGH frame 2810 may have a plurality of parameters such as SISO, a size of 2K FFT, a guard interval of ¼ GI, a pilot pattern of PP1, etc. A second subframe 2812 may have a plurality of parameters such as MIMO, a size of 8K FFT, a guard interval of ⅛ GI, a pilot pattern of PP4, etc. In addition, a first subframe 2811-1 contained in the second NGH frame 2810-1 may have a plurality of parameters such as SISO, a size of 4K FFT, a guard interval of ⅛ GI, a pilot pattern of PP2, etc. A second subframe 2812-1 may have a plurality of parameters such as MIMO, a size of 16K FFT, a guard interval of ⅛ GI, a pilot pattern of PP5, etc. In addition, a first subframe 2811-2 contained in a third NGH frame 2810-2 may have a plurality of parameters such as MISO, a size of 8K FFT, a guard interval of ¹⁄₁₆ GI, a pilot pattern of PP3, etc. A second subframe 281202 may have a plurality of parameters a plurality of parameters such as MIMO, a size of 8K FFT, a guard interval of ¹⁄₁₆ GI, a pilot pattern of PP3, etc.

In this case, parameters of individual subframes are different according to respective subframes, such that the parameters may be transmitted through a dynamic block of L1-post signaling information. However, the same length of NGH frame should be maintained within the superframe. The first subframe and the second subframe contained in each NGH frame maintain different ration of length, such that the same-length NGH frame can be configured.

In accordance with the designer intention, a first subframe and a second subframe contained in some NGH frames of the superframe may have the same parameters as shown in FIG. 28A. In addition, the first subframe and the second subframe contained in the remaining NGH frame may have different parameters as shown in FIG. 28B.

In this case, parameters equally applied to individual subframes of the superframe can be transmitted through the configurable block of the L1-pre signaling information or L1-post signaling information, and parameters differently applied to individual subframes may be transmitted through a dynamic block of L1-post signaling information.

FIG. 29 is a flowchart illustrating a method for transmitting a broadcast signal according to one embodiment of the present invention.

As shown in FIG. 1, the BICM encoder 101300 according to one embodiment may encode PLP (Physical_Layer_Pipe) data and signaling information including a base layer and an enhancement layer of a broadcast service using at least one of SISO, MISO, and MIMO in step S2900.

In this case, the broadcast signal transmitter according to one embodiment of the present invention may independently perform MISO processing and MIMO processing for each input PLP data during the BICM encoding process according to a first embodiment. Alternatively, according to a second embodiment, the broadcast signal transmitter may independently perform MISO processing and MIMO processing for each input PLP data during the BICM encoding process. In addition, MISO processing and MIMO processing may be performed for mapped PLP data within a frame during the OFDM generation process according to a third embodiment. In accordance with a fourth embodiment, independent MIMO processing may be applied to MIMO PLP data to be MIMO processed from among PLP data to be used as input data in the BICM encoding process. The OFDM generator may perform MISO processing for not only MISO PLP data requisite for MISO processing but also L1-signaling information.

In more detail, as shown in FIGS. 16 and 17, the BICM encoder of the broadcast signal transmitter according to a first embodiment may perform MISO encoding or MIMO encoding for input PLP data after completion of constellation mapping, cell interleaving, and time interleaving. The BICM encoder of the broadcast signal transmitter according to the second embodiment may perform MISO encoding or MIMO encoding for each input PLP data after completion of constellation mapping, and may perform cell interleaving and time interleaving.

Thereafter, the frame builder 101400 according to one embodiment may generate a transmission frame including a preamble and PLP data including the encoded signaling information in step S2910. If signaling information and PLP data are processed according to the first and second embodiments, the frame builder according to one embodiment combines symbol-based PLP data and symbol-based L1-signaling data received through each path in units of two cells, such that it may map a pair of two cells to an OFDM symbol carrier.

In addition, assuming that signaling information and PLP data are processed according to the third and fourth embodiments, the frame builder according to one embodiment may prevent MISO PLP data and MIMO PLP data from being mapped into the same OFDM symbol.

In addition, the frame builder according to one embodiment may include a first subframe and a second subframe in one frame as shown in FIGS. 26 to 28. In this case, SIxO-processed data may be transmitted through the first subframe, and MIxO-processed data may be transmitted through the second subframe. However, such data transmission may be changed according to the designer intention.

In addition, individual subframes may be assigned the same or different parameters of PLP data contained in the first and second subframes according to the designer intention.

Thereafter, the OFDM generator 101500 according to one embodiment may perform OFDM modulation of a broadcast signal including the transmission frame, and transmit the OFDM-modulated broadcast signal in step S2920. In accordance with a third embodiment of FIG. 20, the OFDM generator may include a MISO/MIMO encoder. In accordance with a fourth embodiment of the present invention, the OFDM generator may include the MISO encoder.

Figure 30:
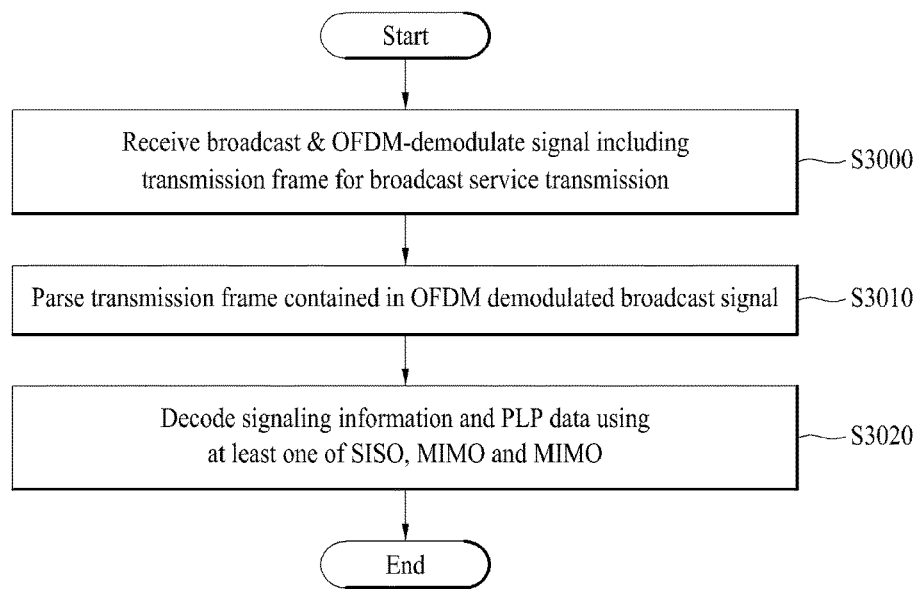
FIG. 30 is a flowchart illustrating a method for receiving a broadcast signal according to an embodiment of the present invention.

FIG. 30 is a flowchart illustrating a method for receiving a broadcast signal according to one embodiment of the present invention.

The OFDM demodulator 107100 according to one embodiment receives a broadcast signal including a transmission frame configured to transmit a broadcast service so that it may OFDM-demodulate the broadcast signal in step S3000. In accordance with the third embodiment of the present invention, the OFDM demodulator may include the MISO/MIMO decoder. In accordance with the fourth embodiment of the present invention, the OFDM demodulator may include the MISO decoder.

Thereafter, the frame parser 107200 according to one embodiment may parse the transmission frame contained in the OFDM-demodulated broadcast signal in step S3010. In this case, the transmission frame may include a preamble and PLP data, and the preamble may include signaling information.

Referring to FIG. 21, according to the first and second embodiments of the present invention, the frame parser combines and extracts two contiguous cells mapped to each frame. In addition, as shown in FIGS. 26 to 28, one frame may include a first subframe and a second subframe. In this case, the broadcast receiver may receive SIxO-processed data through the first subframe, and receive MIxO-processed data through the second subframe according to the designer intention.

In addition, individual subframes may be assigned the same or different parameters of PLP data contained in the first and second subframes. Assuming that the same parameters are assigned to respective subframes, the receiver may receive parameters through the configurable block of L1-pre signaling information or L1-post signaling information. In addition, assuming that different parameters are assigned to respective subframes, the receiver may receive parameters through a dynamic block of L1-post signaling information.

Thereafter, the BICM decoder 107300 according to one embodiment may decode signaling information and PLP data using at least one of SISO, MISO and MIMO in step S3020. As shown in FIGS. 22 and 23, the BICM decoder according to the first and second embodiments may independently apply the MISO scheme to input data received from each path, may independently apply the MIMO scheme to the input data, and may also independently apply the MISO scheme to the signaling information. The BICM decoder according to the third embodiment may not include the MISO decoder and the MIMO decoder, and the BICM decoder according to the fourth embodiment may include only the MIMO decoder.

MODE FOR INVENTION

Various embodiments have been described in the best mode for carrying out the invention.

INDUSTRIAL APPLICABILITY

As described above, embodiments of the present invention can be totally or partially applied to the digital broadcast system.

The invention claimed is:

1. A method for transmitting broadcast signals, the method comprising:
   encoding data in each of a plurality of Physical Layer Pipes (PLPs) with Forward Error Correction (FEC);
   building a frame including the encoded data;
   Orthogonal Frequency Division Multiplexing (OFDM) modulating data in the built frame;
   inserting a first symbol and at least one second symbol into the built frame; and
   transmitting the broadcast signals including the modulated data, the first symbol and the at least one second symbol,
   wherein the first symbol includes a first portion, an effective portion and a second portion, wherein one of the first portion and the second portion is generated by frequency shifting a part of the effective portion of the first symbol and the at least one second symbol includes a third portion, an effective portion and a fourth portion, wherein one of the third portion and the fourth portion is generated by frequency shifting a part of the effective portion of the at least one second symbol, and wherein the built frame comprises one or more subframes.

2. The method of claim 1, wherein the method further comprises:
   Multi-Input Multi-Output (MIMO) encoding data which are transmitted in at least one subframe of the one or more subframes.

3. The method of claim 1, wherein the built frame includes L1 signaling information including information regarding the one or more subframes.

4. The method of claim 1, wherein an FFT size and a guard interval length used for each subframe of the one or more subframes is different or equal per a subframe.

5. An apparatus for transmitting broadcast signals, the apparatus comprising:
   an encoder to encode data in each of a plurality of Physical Layer Pipes (PLPs) with Forward Error Correction (FEC);
   a builder to build a frame including the encoded data; and
   a modulator to Orthogonal Frequency Division Multiplexing (OFDM) modulate data in the built frame;
   an inserter to insert a first symbol and at least one second symbol into the built frame; and
   a transmitter to transmit the broadcast signals including the modulated data, the first symbol and the at least one second symbol,
   wherein the first symbol includes a first portion, an effective portion and a second portion, wherein one of the first portion and the second portion is generated by frequency shifting a part of the effective portion of the first symbol, and
   the at least one second symbol includes a third portion, an effective portion and a fourth portion, wherein one of the third portion and the fourth portion is generated by frequency shifting a part of the effective portion of the at least one second symbol, and wherein the built frame comprises one or more subframes.

6. The apparatus of claim 5, wherein the apparatus comprises:
   a Multi-Input Multi-Output (MIMO) processor to MIMO encode data which are transmitted in at least one subframe of the one or more subframes.

7. The apparatus of claim 5, wherein the built frame includes L1 signaling information including information regarding the one or more subframes.

8. The apparatus of claim 5, wherein an FFT size and a guard interval length used for each subframe of the one or more subframes is different or equal per a subframe.

* * * * *